US012210428B2

(12) United States Patent
Anguiano et al.

(10) Patent No.: US 12,210,428 B2
(45) Date of Patent: Jan. 28, 2025

(54) DETERMINING AN AVAILABILITY OF A DATA CENTER

(71) Applicant: TRADING TECHNOLOGIES INTERNATIONAL, INC., Chicago, IL (US)

(72) Inventors: Frederick J. Anguiano, Chicago, IL (US); Praveen Kannan, Naperville, IL (US); Jeffrey S. Richards, Aurora, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 18/214,226

(22) Filed: Jun. 26, 2023

(65) Prior Publication Data

US 2024/0427676 A1 Dec. 26, 2024

(51) Int. Cl.
*G06F 11/20* (2006.01)
*G06F 11/00* (2006.01)

(52) U.S. Cl.
CPC ........ *G06F 11/2033* (2013.01); *G06F 11/008* (2013.01)

(58) Field of Classification Search
CPC .......................... G06F 11/2033; G06F 11/008
See application file for complete search history.

(56) References Cited

U.S. PATENT DOCUMENTS

| 2020/0092404 | A1* | 3/2020 | Wagmann | ............... H04L 69/40 |
| 2022/0255821 | A1 | 8/2022 | Yousouf et al. | |
| 2024/0111644 | A1* | 4/2024 | Jacobson | ............ G06F 11/2025 |

FOREIGN PATENT DOCUMENTS

WO 2015179533 A1 11/2015

OTHER PUBLICATIONS

International Search Report and Written Opinion for International Application No. PCT/US2024/035217, mailed Oct. 14, 2024.

* cited by examiner

Primary Examiner — Nadeem Iqbal
(74) Attorney, Agent, or Firm — McDonnell Boehnen Hulbert & Berghoff LLP

(57) ABSTRACT

Techniques for determining an availability of a data center, DC, to one or more computing entities external to the DC are described. A DC may, for example, operate one or more applications which are controllable by one or more external computing entities. Disclosed techniques include determining a first status of a first set of one or more communications connections between the DC and a second DC, and a second status of a second set of one or more communications connections between the DC and a third DC. Disclosed techniques include determining an indication of the availability of the DC based on the first status and the second status. Disclosed techniques may involve taking an action responsive to determining that the DC is unavailable, for example, causing applications running at the DC to operate in a disaster recovery mode, and/or failing over functionality of the DC to a failover DC.

20 Claims, 6 Drawing Sheets

DETERMINING AN AVAILABILITY OF A DATA CENTER

BACKGROUND

A data center, DC, typically includes a group of computing devices that provide computing power for executing applications, or functions of such applications. For example, DCs may be used where it may not be feasible or practical to execute one or more resource intensive applications on an individual computing entity, such as a personal computer. In this case, the resource intensive applications, or the functions of those applications, may instead be executed at the DC, thereby taking advantage of the computing power at the DC. Alternatively, or additionally, DCs may be used where it is beneficial that the latency of communications between a computing device executing one or more applications and a further computing device is kept to a minimum. In this case, computing devices of a DC co-located with the further computing device may be used to execute the applications. This minimizes the physical separation of the computing devices and hence inherently minimizes latency of communications between the computing devices. In either case, operation of the applications at the DC may be controlled by one or more computing entities external to the DC.

BRIEF DESCRIPTION OF THE DRAWINGS

Certain embodiments are disclosed with reference to the following drawings.

Figure 1:
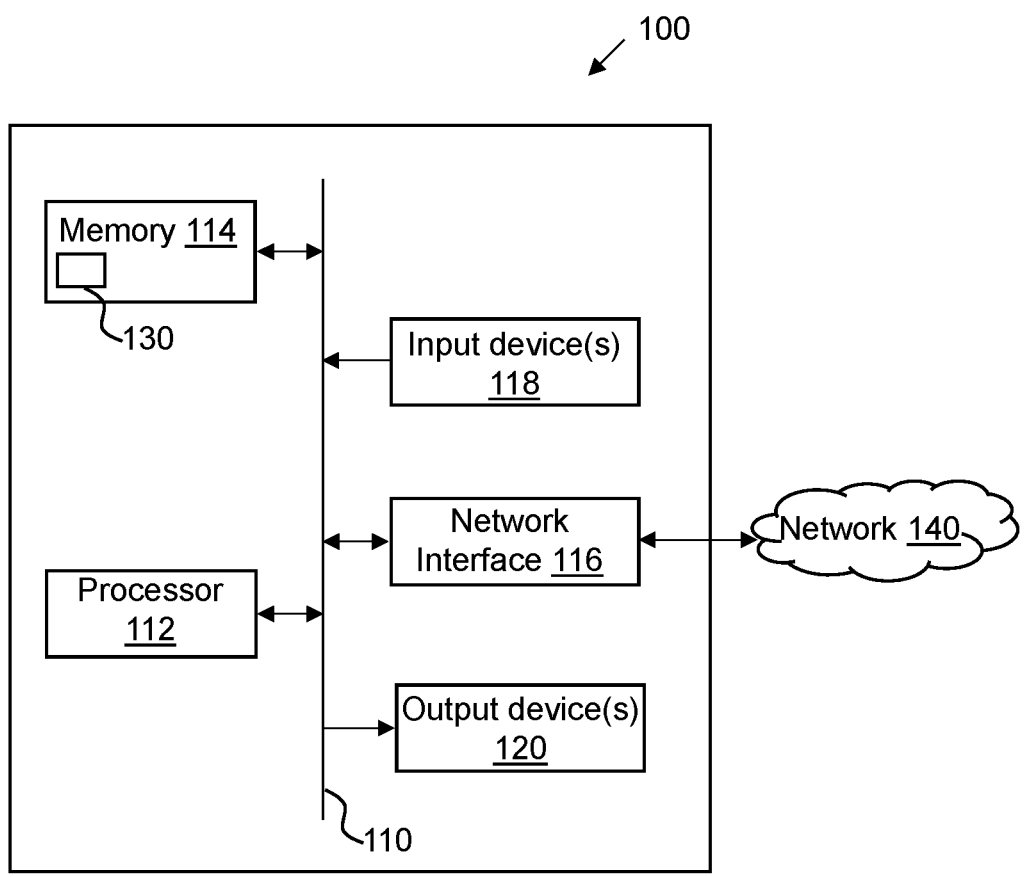
FIG. 1 is a block diagram showing a computing device according to certain embodiments.

Certain embodiments will be better understood when read in conjunction with the provided drawings, which illustrate examples. It should be understood, however, that the embodiments are not limited to the arrangements and instrumentality shown in the attached drawings.

DETAILED DESCRIPTION

The disclosed embodiments generally relate to data centers, DCs, and in particular to methods and systems for determining the availability of a DC to one or more computing entities external to the DC. A computing system at a DC may be configured to receive communications from and/or send communications to the one or more computing entities. For example, certain operations of the computing system may be remotely controllable by one or more computing entities external to the DC. As an example, the one or more external computing entities may be connected to the DC over a network and may send commands to applications running at the DC to control operation of the applications. This control may include, for example, stopping or changing a function performed by one or more applications. This control can be beneficial, for example, in order to avoid one or more of the applications functioning in an unwanted manner.

In some circumstances, the DC may become unavailable to the external computing entities. This may occur where the DC loses connection to the network, or experiences some other disaster or failure, be that of hardware or software, that prevents communication between the DC and the external computing entities. In such circumstances, the ability of the DC to send and/or receive communications from the one or more computing entities external to the DC may be lost. Consequently, for example, applications at the DC may no longer be controllable by the external computing entities, since commands from the external computing entities may be unable to reach the applications running at the DC. In certain examples of such cases, the applications may continue to execute, or new applications may start to execute, at the DC without control by the external computing entities. Such a situation, also referred to as 'islanding' of the DC, may result in the applications functioning in an unwanted manner. In other such cases, applications at the DC may cease to operate altogether, for example, due to a power outage at the DC or a hardware or software malfunction.

For reasons such as those described above, it may be beneficial to determine the availability of the DC to the external computing entities. For example, in circumstances, such as those described above, where the DC becomes unavailable, it may be desirable to take an action in response. As an example, it may be desirable to restore the remotely controllable functioning of applications running at the DC and/or to prevent the applications running at the DC in an unsupervised manner. It may be beneficial to quickly determine that the DC is unavailable such that swift action can be taken in response. However, a false determination that the DC is unavailable may result in action being taken which unnecessarily disrupts the functionality of the DC.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. BRIEF DESCRIPTION OF CERTAIN EMBODIMENTS

Certain embodiments provide a method of determining an indication of an availability of a data center to one or more computing entities external to the data center. The method includes determining, by a computing system, a first status of a first set of one or more communications connections between a first data center and a second data center. The method also includes determining, by the computing system, a second status of a second set of one or more communications connections between the first data center and a third data center different to the second data center. The method also includes determining, by the computing system, based on the first status and the second status, an indication of an availability of the first data center to one or more computing entities external to the first data center.

These features allow for a reliable determination of the availability of the first data center to the one or more computing entities to be obtained. By taking into account the status of respective communications connections between the first data center and at least two other data centers a reliable and robust determination of the availability of the first data center can be made. The method may allow for the risk of making a false determination that the first data center is unavailable to be reduced. For example, the loss of communications between the first data center and just one other data center may be due to a problem particular to communications between those data centers, rather than an outage of the first data center. According to examples of the present method, the first, second and third data centers may form what may be referred to as a quorum and the determination of the availability of the first data center may be determined based on respective statuses of communications connections between the first data center and each of the other data centers in the quorum. For example, the first data center may be only determined to be unavailable, for example, suffering an outage, if each of the other data centers in the quorum agrees that connection to the first data center has been lost.

In certain embodiments, the method includes: determining a third status of a third set of one or more communications connections between the first data center and a fourth data center different to the second data center and the third data center; and wherein the determining of the indication of the availability of the first data center is based on the third status. Basing the determination of the availability of the first data center on the third status can increase the reliability of the determination. For example, the chance of falsely detecting that the first data center is unavailable may be reduced by the addition of the fourth data center to the quorum of data centers and the taking into account of additional information regarding the status of communications between the first data center and the fourth data center. For example, if the first, second and third statuses indicate that the first data center has lost communication with the second and third data centers but maintains a good connection to the fourth data center, then it may be determined that the first data center remains available.

In certain embodiments, the determining of the indication of the availability of the first data center includes determining, responsive to the respective statuses of each of the sets of communications connections indicating that each of the sets of communications is inoperative, that the first data center is unavailable to the one or more computing entities external to the first data center. These features allow for a reliable indication that the first data center is unavailable to be made responsive to a determination that the respective sets of communications connections between the first data center and both the second and third data centers have been lost. Accordingly, the chance of falsely determining that the first data center is unavailable is reduced, since the first data center is only determined to be unavailable if the communications connections to both the second and third data centers are lost and not, for example, if communications between the first data center and only one other data center is lost.

In certain embodiments, for each given set of the sets of communications connections, the determining of the status of the given set is based on respective statuses of the one or more communications connections of the given set. Accordingly, the status of the set of communications connections between, for example, the first data center and the second data center, may be determined based on statuses of individual communications connections between the first data center and the second data center.

In certain embodiments, each of the sets of communications connections includes two or more communications connections. That is, each set of communications connections between two particular data centers may include two or more communications connections. This allows for the status of a given set of communications connections to be determined based on two or more communications connections. This may provide a more reliable determination of the status of communications between a given pair of data centers by providing additional information upon which to base the determination. For example, the status of communications between the first data center and the second data center may be determined based on a status of a first communications connection between the first data center and the second data center and the status of a second communications connection between the first data center and the second data center.

In certain embodiments, determining the status of a given one of the sets of communications connections includes determining respective statuses of the two or more communications connections of the given set and determining the given set to be inoperative responsive to determining that each of the two or more communications connections of the given set is inoperative. This may allow for a reduction in instances of falsely determining that communications between a given pair of data centers have been lost. For example, considering the set of communications connections between the first and second data centers, it may be determined that a first connection is inoperative while a second connection remains operative. In this circumstance, it may be determined that communications between the first data center and the second data center remain operative. For example, there may be an issue which is particular to the first communications connection or to a particular mode of communication used by the first communications connection, but this is not taken as indicative of a loss of communications between the first data and the second data center if there is at least one communications connection between the first and second data centers which remains operative. In some embodiments, at least two of the two or more communications connections are of a different type. For example, one connection may be a UDP connection, while the other is a TCP connection. This may provide diversity in a set of communications connections such that any failure of all communications connections in the set can more reliably be attributed to a complete loss of communication between the data centers, rather than a problem which is particular to mode of communication.

In certain embodiments, each of the sets of communications connections includes a respective first communications connection for receiving heartbeat messages from a given one of the data centers; and for each given set of the sets of communications connections, determining the status of the given set includes determining a status of the first communications connection of the given set by monitoring receipt of the heartbeat messages. As an example, heartbeats may be transmitted by the first data center to each of the other data centers. The heartbeats may be transmitted periodically, for example, every 30 seconds. The other data centers may monitor receipt of the heartbeats from the first data center and determine the status of their respective first communications connection to the first data center based on whether the heartbeats are received. For example, the second data center may determine that its first communications connection to the first data center is down if a given number of consecutive heartbeats, for example, three consecutive heartbeats, are not received. This may provide an effective means of determining the status of the first communications connection. For example, a loss of communications which persists for a significant period of time may be reliably detected but the loss of one or two heartbeats may be disregarded so as not to unnecessarily determine that communication has been lost. The data centers other than the first data center may also each transmit their own heartbeats to one another and to the first data center. The first data center may monitor receipt of these heartbeats, for example, in the same manner described above, and thereby determine the status of respective first communications channels from the other data centers to the first data center.

In certain embodiments, the first communications connections each include a subscription to one or more multicast channels over which the heartbeat messages are transmitted. For example, the given data center may transmit heartbeat messages using UDP. For example, the heartbeat messages may be sent by LBM (Latency Busters Messaging). By transmitting the heartbeats over a multicast channel, the heartbeat messages can be sent in an efficient manner to each of the other data centers.

In certain embodiments, each of the sets of communications connections includes a respective second communications connection for allowing inspection of a location at a given one of the data centers; and for each given set of the sets of communications connections, determining the status of the given set includes determining whether the location at the given one of the data centers can be successfully inspected by use of the respective second communications connection. This provides an effective way of monitoring an additional or alternative communications connection between data centers.

In certain embodiments, the second communications connections each include a respective TCP connection. As described above, in certain embodiments, each given set of communications connections may include communications connections of different types. Where the sets of communications connections each include a first communications connection and a second communications connection, the first communications connection may be a UDP connection, while the second is a TCP connection. This may provide redundancy in the set of communications connections and reduce the chance that the failure which is particular to a particular type of communications connection results in a false determination that communication between a given pair of data centers has failed.

In certain embodiments, the determining of the respective statuses of each of the sets of communications connections and the determining of the availability of the first data center are performed at the first data center. This may provide a reliable means for the first data center to determine whether it is available to the one or more external computing entities. As an example, the first data center may determine that it is unavailable if it determines that the status of each of the sets of communications connections between itself and the other data centers is inoperative. The first data center may act autonomously to determine its own availability and can determine that it is unavailable in circumstances where it is not possible for the first data center to receive commands from external computing entities.

In certain embodiments, the method includes: responsive to determining that the first data center is unavailable to the one or more computing entities external to the first data center, initiating one or more of: a shut-down process to shut down one or more applications running at the first data center; a disaster recovery process to cause one or more applications running at the first data center to operate in a disaster recovery mode. Various actions may be taken in response to a determination that the first data center is unavailable. Since the availability of the first data center may be determined at the first data center, the reliance on an operator to initiate a response to an outage or islanding at the first data center may be reduced. For example, the first data center may initiate a shut-down or disaster recovery process responsive to a determination by the computing system at the first data center that the first data center has become unavailable to the one or more external computing entities. Accordingly, the problem of an operator having to manually take action in response to an outage relating to the first data center, for example, removing power at the first data center, can be addressed. Since these actions may be performed autonomously at the first data center, the actions may be taken more quickly than if there were a need for an operator to manually initiate the operations. This can reduce the risk from applications at the first data center running in an unwanted manner without control by the one or more external computing entities.

In certain embodiments, the determining of the respective statuses of each of the sets of communications connections and the determining of the availability of the first data center are performed at a data center different to the first data center. Accordingly, the availability of the first data center may be monitored by a computing entity at a data center external to the first data center. This may be advantageous in circumstances where the first data center becomes unavailable. For example, the data center at which the computing entity is located may remain in communication with external computing entities and therefore may be able to initiate actions which it may not be possible to initiate at the first data center, such as communicating the loss of availability of the first data center to other entities.

In certain embodiments, the determining of the respective statuses of each of the sets of communications connections and the determining of the availability of the first data center are performed at the third data center. In such embodiments, the availability of the first data center may be monitored at the third data center which itself is part of a system including the first data center and the second data center. This may allow for the third data center to coordinate actions to be taken in response to the first data center becoming unavailable and to effectively communicate any loss of availability of the first data center to the second data center.

In certain embodiments, for at least one given set of the sets of communications connections, determining the status of the given set includes: obtaining, from the data center which is connected to the first data center by the one or more communication connections of the given set, information regarding the one or more communications connections of the given set; and determining the status of the given set based on the obtained information. The data center which performs the method may therefore collate information on the statuses of the sets of communications connections between the first data center and the other data centers and determine the availability of the first data center based on this information. For example, each data center may determine the status of the communications connections between itself and the first data center and store this in a location which is accessible to the data center which performs the method, for example, the second data center. This information can then be accessed by the data center which performs the method and used to reliably determine the availability of the first data center. Accordingly, for example, a computing entity at the third data center may determine that the first data center is unavailable if it determines that the third data center has lost communications from the first data center and, further, the other data centers in the quorum have also lost communications from the first data center.

In certain embodiments, the method includes: responsive to determining that the first data center is unavailable to the one or more computing entities external to the first data center, initiating a failover process for failing over functionality of the first data center to a failover data center. The data center which determines that the first data center is unavailable may therefore reliably and quickly initiate failover of the functionality of the first data center to the failover data center.

In certain embodiments, the initiating of the failover process includes: sending, from the data center which determines that the first data center is unavailable, a message to the failover data center to instruct the failover data center to fail over the functionality of the first data center. The data center which performs the method may remain in communication with the other data centers in the quorum despite the unavailability of the first data center. For example, the unavailability of the first data center may be due to a software or hardware malfunction at the first data center which leaves the other data centers in the quorum unaffected. Accordingly, the data center may, for example, initiate failover of the functionality of the first data center to a failover data center which is another of the data centers in the quorum. In other examples, the failover data center may be a data center which is not part of the quorum.

In certain embodiments, the failover data center is the second data center. In such examples, the third data center initiates failover of the functionality of the first data center to the second data center. Since the first, second and third data centers are all in the quorum, the third data center can effectively monitor both the first data center and the second data center to determine when the first data center is unavailable and if the second data center is available to take over the functionality of the first data center. The third data center can therefore effectively initiate failover when necessary.

In certain embodiments, the data center different to the first data center, at which the determining of the respective statuses of each of the sets of communications connections and the determining of the availability of the first data center are performed, performs the determinations responsive to a determination that another data center is unavailable to perform the determinations. For example, a further data center may perform the determination of the respective statuses of each of the sets of communications connections and the determination of the availability of the first data center responsive to the further data center determining that another data center, such as the third data center, is not available to perform this determination. This allows for a redundancy to be provided for the functionality of the data center which is to determine the availability of the first data center and, for example, coordinate failover of the functionality of the first data center. In some such examples, the further data center may be the fourth data center. In other examples, the further data center may be a data center which is not one of the first, second, third and fourth data centers.

In certain embodiments, the failover process includes, for each of one or more applications running at the first data center, one or more of: running the application at the failover data center; and modifying the operation of an existing application at the failover data center to include one or more functions of the application. In this manner, functionality at the first data center can be taken up by the failover data center when the first data center is determined to be unavailable.

Certain embodiments provide a computing system, including: a memory; and one or more processors configured to: determine a first status of a first set of one or more communications connections between a first data center and a second data center; determine a second status of a second set of one or more communications connections between the first data center and a third data center different to the second data center; and determine, based on the first status and the second status, an indication of an availability of the first data center to one or more computing entities external to the first data center. As above, this allows for a reliable determination of the availability of the first data center to be made in an effective manner.

Certain embodiments provide a data center including: a computing system, including: a memory; and one or more processors configured to: determine a first status of a first set of one or more communications connections between a first data center and a second data center; determine a second status of a second set of one or more communications connections between the first data center and a third data center different to the second data center; and determine, based on the first status and the second status, an indication of an availability of the first data center to one or more computing entities external to the first data center. As above, this allows for the computing system to determine the availability of the first data center in a reliable and effective manner. The data center which includes the computing system may, for example, be the first data center itself. This allows for the first data center to respond quickly and/or automatically to becoming islanded. Alternatively, the data center which includes the computing system may be another data center other than the first data center, for example, the third data center or the second data center. This allows for the availability of the first data center to be determined in a reliable and effective manner by a further data center which may, for example, take an action in response, such as initiating failover of functionality of the first data center to another, failover, data center.

Certain embodiments provide a tangible computer-readable storage medium including instructions that, when executed, cause one or more processors of a computing system to: determine a first status of a first set of one or more communications connections between a first data center and a second data center; determine a second status of a second set of one or more communications connections between the first data center and a third data center different to the second data center; and determine, based on the first status and the second status, an indication of an availability of the first data center to one or more computing entities external to the first data center. As above, this allows for a reliable determination of the availability of the first data center to be made in an effective manner.

II. EXAMPLE COMPUTING DEVICE

FIG. 1 illustrates a block diagram of an example computing device 100. The computing device 100 may be used to implement certain embodiments described herein. In other examples, other computing devices may be used. The computing device 100 includes a communication bus 110, a processor 112, a memory 114, a network interface 116, an input device 118, and an output device 120. The processor 112, memory 114, network interface 116, input device 118 and output device 120 are coupled to the communication bus 110. The computing device 100 is connected to an external network 140, such as a local area network (LAN) or a wide area network (WAN), like the Internet. The computing device is connected to the external network 140 via the network interface 116. The computing device 100 may include additional, different, or fewer components. For example, multiple communication buses (or other kinds of component interconnects), multiple processors, multiple memory devices, multiple interfaces, multiple input devices, multiple output devices, or any combination thereof, may be provided. As another example, the computing device 100 may not include an input device 118 or output device 120. As another example, one or more components of the computing device 100 may be combined into a single physical element, such as a field programmable gate array (FPGA) or a system-on-a-chip (SoC).

The communication bus 110 may include a channel, electrical or optical network, circuit, switch, fabric, or other mechanism for communicating data between components in the computing device 100. The communication bus 110 may be communicatively coupled with and transfer data between any of the components of the computing device 100.

The processor 112 may be any suitable processor, processing unit, or microprocessor. The processor 112 may include one or more general processors, digital signal processors, application specific integrated circuits, FPGAs, analog circuits, digital circuits, programmed processors, and/or combinations thereof, for example. The processor 112 may be a multi-core processor, which may include multiple processing cores of the same or different type. The processor 112 may be a single device or a combination of devices, such as one or more devices associated with a network or distributed processing system. The processor 112 may support various processing strategies, such as multi-processing, multi-tasking, parallel processing, and/or remote processing. Processing may be local or remote and may be moved from one processor to another processor. In certain embodiments, the computing device 100 is a multi-processor system and, thus, may include one or more additional processors which are communicatively coupled to the communication bus 110.

The processor 112 may be operable to execute logic and other computer readable instructions encoded in one or more tangible media, such as the memory 114. As used herein, logic encoded in one or more tangible media includes instructions which may be executable by the processor 112 or a different processor. The logic may be stored as part of software, hardware, integrated circuits, firmware, and/or micro-code, for example. The logic may be received from an external communication device via a communication network 140. The processor 112 may execute the logic to perform the functions, acts, or tasks described herein.

The memory 114 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 114 may include any desired type of mass storage device including hard disk drives, optical media, magnetic tape or disk, etc.

The memory 114 may include one or more memory devices. For example, the memory 114 may include cache memory, local memory, a mass storage device, volatile memory, non-volatile memory, or a combination thereof. The memory 114 may be adjacent to, part of, programmed with, networked with, and/or remote from processor 112, so the data stored in the memory 114 may be retrieved and processed by the processor 112, for example. The memory 114 may store instructions which are executable by the processor 112. The instructions may be executed to perform one or more of the acts or functions described herein.

The memory 114 may store an application 130 implementing the disclosed techniques. In certain embodiments, the application 130 may be accessed from or stored in different locations. The processor 112 may access the application 130 stored in the memory 114 and execute computer-readable instructions included in the application 130.

The network interface 116 may include one or more network adaptors. The network adaptors may be wired or wireless network adaptors. The network interface 116 may allow communication by the computing device 100 with an external network 140. The computing device 100 may communicate with other devices via the network interface 116 using one or more network protocols such as Ethernet, Internet Protocol (IP), Transmission Control Protocol (TCP), User Datagram Protocol (UDP), wireless network protocols such as Wi-Fi, Long Term Evolution (LTE) protocol, or other suitable protocols.

The input device(s) 118 may include a positional input device, such as a mouse, touchpad, touchscreen, or the like; a keyboard, button, switch, or the like; and/or other human and machine interface devices. The output device(s) 120 may include a display, which can be a liquid crystal display (LCD), a cathode-ray tube (CRT), a light emitting diode (LED) display (such as an OLED display), or other suitable display.

In certain embodiments, during an installation process, the application may be transferred from the input device 118 and/or the network 140 to the memory 114. When the computing device 100 is running or preparing to run the application 130, the processor 112 may retrieve the instructions from the memory 114 via the communication bus 110.

III. EXAMPLE SYSTEM

Figure 2:
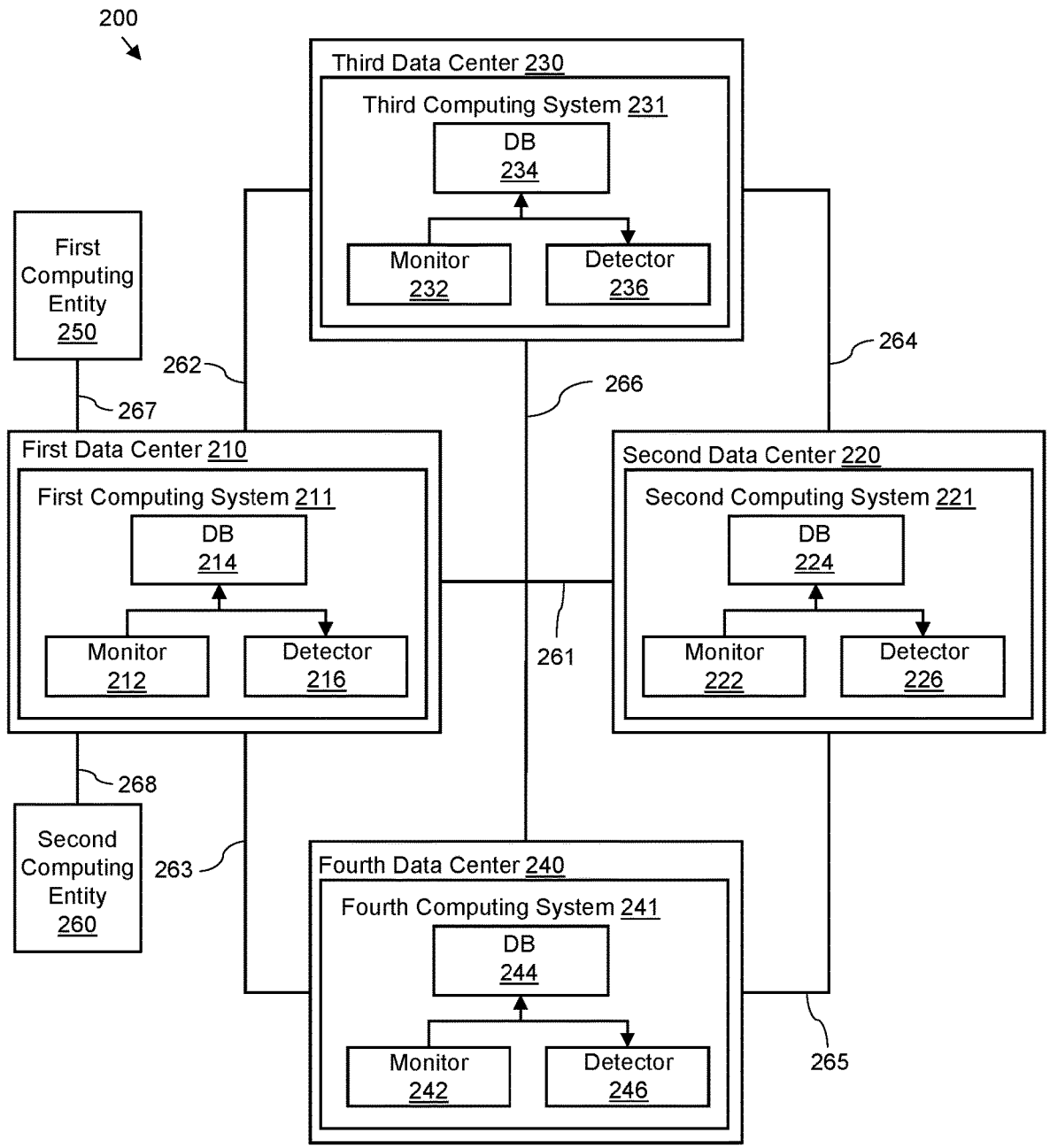
FIG. 2 is a block diagram showing an example system in which certain embodiments may be implemented.

FIG. 2 is a block diagram showing a schematic representation of an example system 200. The system 200 includes a first data center, DC, 210, a second DC 220, a third DC 230 and a fourth DC 240. The DCs 210, 220, 230, 240 are communicably connected to one another via respective networks. Specifically, the first DC 210 and the second DC 220 are communicably connected via a first network 261; the first DC 210 and the third DC 230 are communicably connected via a second network 262; the first DC 220 and the fourth DC 240 are communicably connected via a third network 263; the second DC 220 and the third DC 230 are communicably connected via a fourth network 264; the second DC 220 and the fourth DC 240 are communicably connected via a fifth network 265; and the third DC 230 and the fourth DC 240 are communicably connected via a sixth network 266.

Each of the DCs 210, 220, 230, 240 includes a respective computing system which includes components which maintain and monitor communications between the DCs 210, 220, 230, 240. Namely, the first DC 210 includes a first computing system 211 which includes a first monitor 212, a first database 214 and a first detector 216. The second DC 220 includes a second computing system 221 which includes a second monitor 222, a second database 224, and a second detector 226. The third DC 230 includes a third computing system 231 which includes a third monitor 232, a third database 234, and a third detector 236. The fourth DC 240 includes a fourth computing system 241 which includes a fourth monitor 242, a fourth database 244, and a fourth detector 246. The first monitor 212 is communicably connected to the first database 214, and to the first detector 216, for example, via a local area network. The components within each of the second, third and fourth computing systems 221, 231, 241 are connected in a similar manner.

The first computing system 211 of the first DC 210 may be implemented by or otherwise include one or a plurality of the computing devices 100 described above with reference to FIG. 1. One or both of the first monitor 212 and the first detector 216 may be implemented as software executed on one or more computing devices (for example, the computing device 100 described above with reference to FIG. 1) of the first computing system 211. For example, the first monitor 212 the detector 216 may be executed on respective different computing devices (for example, the computing device 100 described above with reference to FIG. 1) of the computing system 211, although it will be appreciated that this need not necessarily be the case and other configurations are possible. The first database 214 is stored in storage of the first computing system 211. For example, the first database 214 may be stored in memory of a computing device (for example, the memory 114 of a computing device 100 described above with reference to FIG. 1) of the first computing system 211. The second, third and fourth computing systems 221, 231, 241 may have any of features described above for the first computing system 211.

The system also includes a first computing entity 250 and a second computing entity 260. The first computing entity 250 and the second computing entity 260 are communicably connected to the first DC 210 via respectively, a seventh network 267 and an eighth network 268. In examples, one or more of the first to eighth communications networks 261-268 may include one or more of a local area network, a wide area network, a multicast network, a wireless network, a virtual private network, an internal network, a cellular network, a peer-to-peer network, a point-of-presence, a dedicated line, the Internet, a shared memory system, and/or a proprietary network. One or more of the first to eighth communications networks 261-268 may be different, in whole or in part, from one another or may be the same network. The DCs 210, 220, 230, 240 may be in different locations to one another, for example, in different cities or countries. The system 200 may, in some examples, be one of multiple such systems. For example, the system 200 may be located in a first geographical region and further similar systems may be provided in further geographical regions. When operating properly, the first DC 210 is configured to communicate with the first computing entity 250 and the second computing entity 260. The first DC 210 may, for example, operate one or more applications (not shown in FIG. 2) which are controllable by the first computing entity 250. The applications may cause information to be communicated to and information to be received from the first computing entity 250 and/or the second computing entity 260. In some examples, (as illustrated in FIG. 2) the first computing entity 250 and the second computing entity 260 may be external to the first DC 210. However, in other examples (not shown), one or both of the first and second computing entities 250, 260 may be part of the first DC 210, that is, co-located with the first computing system 211.

Each of the monitors 212, 222, 232, 242 is configured to maintain and monitor a respective set of communications connections between itself and each of the other monitors 212, 222, 232, 242, which may be referred to herein as its peers. Each set of communications connections allows the transmission of information from a monitor of one of the DCs 210, 220, 230, 240 to a monitor of the another of the DCs 210, 220, 230, 240 over the respective network that connects the two DCs. For example, a set of communications connections allows information to be transmitted from the first monitor 212 to the second monitor 222 via the first network 261. A different set of communications connections allows information to be transmitted from the second monitor 222 to the first monitor 212 via the first network 261. Similarly, another set of communications connections allows information to be transmitted from the first monitor 212 to the third monitor 232 via the second network 262, and a different set of communications connections allows information to be transmitted from the third monitor 232 to the first monitor 212 via the second network 262. Similarly, again, another set of communications connections allows information to be transmitted from the first monitor 212 to the fourth monitor 242 via the third network 263, and a different set of communications connections allows information to be transmitted from the fourth monitor 242 to the first monitor 212 via the third network 263.

Each set of communications connections may include multiple communications connections which may be of the same type or a different type to one another. As an example, a particular set of communications connections may include two communications connections using a different protocol to one another, for example, a UDP connection and a TCP connection. Additionally, or alternatively, each communications connection in a set of communications connections may be transmitted over separate paths, for example, over separate VLANs.

In one example, each of the sets of communications connections which allows information to be transmitted from one of the monitors 212, 222, 232, 242 to a particular one of its peers includes a first communications connection for transmitting heartbeats. As an example, each monitor 212, 222, 232, 242 may transmit heartbeats over a respective multicast channel. Each monitor 212, 222, 232, 242 may also subscribe to the respective multicast channels of each of its peers to receive heartbeats from its peers. Each subscription by a monitor 212, 222, 232, 242 to a multicast channel of one of its peers may be considered to be a first communications channel for the transmission of information from the monitor 212, 222, 232, 242 transmitting the heartbeats to the monitor 212, 222, 232, 242 which is subscribed to receive the heartbeats. For example, each subscription by the second, third and fourth monitors 222, 232, 242 to the multicast channel on which the first monitor 212 transmits its heartbeats may be considered to be a respective first communications connection from the first monitor 212. Each multicast channel may be made via UDP, for example, using Latency Busters Messaging (LBM). For example, each monitor 212, 222, 232, 242 may transmit its heartbeats using a unique LBM topic and may subscribe to the topics of the its peers to receive their heartbeats. Heartbeats may be transmitted by each of the monitors 212, 222, 232, 242 periodically. For example, each monitor 212, 222, 232, 242 may multicast a heartbeat at regular intervals, for example, of 1 minute, 30 seconds, 20 seconds, 10 seconds or 5 seconds.

On receiving a heartbeat from one of its peers, each of the monitors 212, 222, 232, 242 is configured to record receipt of the heartbeat and a timestamp for the receipt of the heartbeat in a particular location in its respective database. Considering, as an example, the operation of the first monitor 212 in this regard, the first monitor 212 is configured to receive, via subscriptions to respective multicast channels, second heartbeats from the second monitor 222, third heartbeats from the third monitor 232 and fourth heartbeats from the fourth monitor 242. Responsive to receiving a second heartbeat from the second monitor 222, the first monitor 212 records the receipt of the second heartbeat and a timestamp for the received second heartbeat at a particular location, associated with the second monitor 222, in the first database 214. The first monitor 212 may store the timestamp of the last received heartbeat from the second monitor 222 in the location. The first monitor 212 may similarly record, in respective locations the first database 214, a record of receipt and a timestamp for receipt of third heartbeats from the third monitor 232 and fourth heartbeats from the fourth monitor 242. The second monitor 222, third monitor 232 and the fourth monitor 242 operate in a similar manner to record the receipt of heartbeats from their peers in their respective databases 222, 234, 244. As will be described in more detail below, each detector 216, 226, 236, 246 is configured to determine a status of the first communications connections of its associated monitor to its peers based on the record of the receipt of heartbeats from the peers.

In some examples, each of the sets of communications connections which allows information to be transmitted from one of the monitors 212, 222, 232, 242 to a particular one of its peers also includes a respective second communications connection. Each second communications connection allows a particular one of the monitors 212, 222, 232, 242 to inspect a location at a particular one of its peers, for example, a location in the database associated with that peer. For example, a second communications connection from the first monitor 212 to the second monitor 222 may allow the first monitor 212 to inspect a location in the second database 224. The second communications connection may be a read-only connection. The second communications connections may, for example, each include a TCP connection between the monitors.

Each monitor 212, 222, 232, 242 is configured to write into its database 214, 224, 234, 244 an indication of whether it is able to inspect a respective location in the databases of each of its peers. For example, the first monitor 212 is configured to monitor the status of the second communications connection from the second monitor 222 to the first monitor 212 by (for example, periodically) attempting to inspect a particular location at the second database 224. This inspection may include a read-only operation performed by the first monitor 212. If the first monitor 212 is able to inspect the location in the second database 224, then the first monitor 212 writes an indication that it is able to inspect the location to the first database 214 at a location in the first database 214 associated with the second monitor 222. However, if the first monitor 212 is unable to read the location in the second database 224 then the first monitor 212 writes to the first database 214 an indication that it is unable to inspect the location. The first monitor 212 similarly determines whether it is able to inspect the locations in the third database 234 and the fourth database 244 and writes indications of the results of these attempted inspections to respective locations associated with the third monitor 232 and the fourth monitor 242 in the first database 214. Each of the second, third and fourth monitors 222, 232, 242 operate in a similar manner to monitor and record whether they are able to inspect the relevant locations in the databases of their peers. Accordingly, each monitor 212, 222, 232, 242 records in its associated database 214, 224, 234, 244 the readability of the locations in the databases of its peers from its own point of view.

In an example, the databases 214, 224, 234, 244 each store data at locations identified by respective paths. For example, similar to a file system, the path of a particular location may be made up of a hierarchical sequence of path elements. Accordingly, data may be written to or read from a specific path in a given one of the databases 214, 224, 234, 244. Each monitor 212, 222, 232, 242 may maintain its own set of locations, stored in its associated database 214, 224, 234, 244. Each monitor 212, 222, 232, 242 may place a watch on respective particular locations in the databases of its peers, and write to a corresponding location in its own database that the connection to a particular remains operative while the watch is not triggered. If the location at the database of one of its peers becomes unreadable then the monitor may receive a notification of the same via the watch. The monitor then writes to a particular location in the set of locations in its database that the connection to that particular peer is inoperative. The locations in which each given monitor records the receipt of heartbeats from its peers may also be a part of the same set of locations. For example, in the first database 214 there may be, to record the statuses of the connections from the second monitor 222 to the first monitor 212, a first location at which the time of receipt of the latest heartbeat from the second monitor 222 is recorded and a second location at which the readability of the second database 224 according to the first monitor 212 is recorded. There may also be in the first database 214 first and second locations for recording the statuses of each of the third monitor 232 and the fourth monitor 242 to the first monitor 212. There may be a similar set of locations in each of the second, third and fourth databases 224, 234, 244 for recording the statuses of the communications connections between the second, third and fourth monitors 222, 232, 242 and their respective peers.

The information stored in the database of a particular DC 210, 220, 230, 240 may be used to determine the status of communications connections between DCs. As will be described below in more detail, this information may be used to determine the availability of a particular DC. For example, the availability of the first DC 210 to one or more computing entities external to the first DC 210, which may include the first computing entity 250 and/or the second computing entity 260, may be determined.

In one such example, the first detector 216 is configured to determine the status of the set of communications connections from the second monitor 222 to the first monitor 212 based on the information stored in the first database 214 regarding: the first communications connection over which the second monitor 222 transmits heartbeats to the first monitor 212; and the second communications connection via which the first monitor 212 can inspect the relevant location in the second database 224.

Regarding the first communications connection, the first detector 216 is configured to determine that the first communications connection from the second monitor 222 is inoperative if a heartbeat has not been received by the first monitor 212 from the second monitor 222 for a pre-determined period, which may be referred to as a timeout threshold. The timeout threshold may, for example, be set as an integer multiple of the expected period between the transmission of heartbeats by the second monitor 222. Accordingly, the timeout threshold may be determined to be exceeded if a pre-determined number of successive heartbeats, for example, one, two, three, or four or more successive heartbeats, are not received from the second monitor 222. This determination may be based on the timestamp of the latest heartbeat received and the expected period between heartbeats. In one example, the timeout threshold applied by the first detector 216 to heartbeats from the second monitor 222 is three heartbeat periods and the period between the expected transmission of heartbeats is 30 seconds, making the timeout threshold 90 seconds. If 90 seconds elapse without receipt of a heartbeat from the second monitor 222, the first detector 216 determines that the first communications connection is inoperative. Otherwise, if at least one heartbeat from the second monitor 222 has been received before the timeout period elapses, the first detector 216 determines that the first communications connection from the second monitor 222 remains operative. In some examples, a result of the determination of the status of the first communications connection is written to the first database 214.

The first detector 216 is configured to determine the status of the second communications channel from the second monitor 222 to the first monitor 212 based on the information stored in the first database 214 regarding whether the first monitor 212 is able to inspect the respective location in the second database 224. In some examples, a result of the determination of the status of the second communications connection is written to the first database 214.

The detector 216 is configured to use the determined statuses of the first communications channel and the second communications channel from the second monitor 222 to the first monitor 212 to determine the overall status of the set of communications channels from the second monitor 222 to the first monitor 212. Namely, if both the first communication channel and the second communications channel are inoperative, then the overall status of the set of communications channels is determined as inoperative. This provides an indication, from the point of view of the first DC 210, that it is no longer able to receive communications from the second DC 220. If, however, only one of the first communications channel and the second communications channel is determined to be inoperative, the first detector 216 determines the overall status of the set of communications channels to be operative.

In a similar manner to that described above for the set of communications connections from the second monitor 222 to the first monitor 212, the first detector 216 is configured to determine a status of a set of communications connections from the third monitor 232 to the first monitor 212, and a status of a set of communications connections from the fourth monitor 242 to the first monitor 212.

The first detector 216 is configured to then determine, based on the determined respective statuses of the sets of communications connections from the second, third and fourth monitors 222, 232, 242 to the first monitor 212, the availability of the first DC 210. The first detector 216 may determine that the first DC 210 is unavailable if all of the sets of communications connections over which it is configured to receive information from its peers are inoperative. Specifically, the first detector 216 may determine that the first DC 210 is unavailable if the first detector 216 determines that: the time elapsed since the first monitor 212 has received a heartbeat from the second monitor 222 exceeds the timeout threshold, and the first monitor 212 is unable to inspect the location at the second database 224; the time elapsed since the first monitor 212 has received a heartbeat from the third monitor 232 exceeds the timeout threshold, and the first monitor 212 is unable to inspect the location at the third database 234; and the time elapsed since the first monitor 212 has received a heartbeat from the fourth monitor 242 exceeds the timeout threshold, and the first monitor 212 is unable to inspect the location at the fourth database 244.

If, however, at least one of the respective sets of communications connections to the second, third and fourth monitors 222, 232, 242 remains operative, then the first detector 216 determines that the first DC 210 remains available. As such, if there is an indication that the first DC 210 remains in communication with at least one of the other DCs 220, 230, 240, then it is determined that the first DC 210 is available. A determination by the first detector 216 that the first DC 210 is unavailable may result from a complete loss of communications from the second, third and fourth DCs 220, 230, 240 to the first DC 210. This may occur, for example, because of a software or hardware malfunction at the first DC 210 which nevertheless allows functionality at the first DC 210, including the first detector 216, to remain operational. This may be referred to as 'islanding' of the first DC 210. In such circumstances, unless action is taken, applications at the first DC 210 may continue to operate without external control. This may be undesirable in a situation where the first DC 210 is unavailable and, for example, commands from an external computing entity, such as the first computing entity 250, are not able to reach applications running at the first DC 210. For example, a scenario may arise where the first DC 210 loses communication to the first computing entity 250 but remains in communication with the second computing entity 260. This may occur due to the second computing entity 260 being co-located with the first DC 210 and therefore able to maintain communication with the first DC 210 even in circumstances where communication between the first DC 210 and other external entities is lost. In such a scenario, applications at the first DC 210 may continue to run and communicate with the second computing entity 260 without those applications being controllable by the first computing entity 250. By basing the determination of the availability of the first DC 210 on an indication of the status of communications from the first DC 210 to all of its peers, a robust and reliable determination of the availability can be made. For example, determining that the first DC 210 is unavailable only when an indication is determined that communication to all of the peer DCs 220, 230, 240 has been lost, the risk of a false determination that the first DC 210 is unavailable may be mitigated. For example, the risk of falsely determining the first DC 210 to be unavailable based on the loss of a particular communications channel may be mitigated.

Various actions may be taken responsive to a determination by the first detector 216 that the first DC 210 is unavailable. For example, a shutdown of one or more applications running at the first DC 210 may be initiated. This may be performed to reduce the risk from applications at the first DC 210 continuing to run and possibly running in an unwanted manner following the first DC 210 becoming unavailable. According to certain examples described herein, the detection by the first detector 216 that the first DC 210 is unavailable may be automatic, and, therefore, may be obtained quickly and in an efficient manner. This automatic determination that the first DC 210 is unavailable also allows for components at the first DC 210 to be notified of this fact in a circumstance where communication between the first DC 210 and external entities has broken down. Accordingly, action can be taken quickly and efficiently at the first DC 210 without, for example, the need for a command from an entity external to the first DC 210 or for manual intervention at the first DC 210. This may mitigate risks such as those described above of applications continuing to run at the first DC 210 without being controllable in the desired manner. In some examples, as will be described in more detail below with reference to FIG. 3, responsive to determining that the first DC 210 is unavailable to the one or more computing entities, an indication may be provided to one or more applications (not shown in FIG. 2) running at the first DC 210. The indication may, for example, cause the applications to operate in a disaster recovery mode, which may include stopping or preventing one or more functions of the applications from being performed.

In some circumstances, the first DC 210 may become unavailable, for example, because of a loss of power to the first DC 210 or hardware failure at the first DC 210, in a manner which results in the first computing system 211 not remaining operational. In such examples, the first DC 210 may be unable to determine its own unavailability. However, in such examples, it may also be unnecessary for action to be taken at the first DC 210 to shut down or modify functionality at the first DC 210, since this functionality may no longer be operational.

Alternatively, or in addition to the availability of the first DC 210 being determined at the first DC 210, by the first computing system 211, in examples, the availability of the first DC 210 may be determined at one or more of the other DCs 220, 230, 240. In one such example, the third computing system 231 at the third DC 230 is configured to monitor the availability of the first DC 210. In this example, the third detector 236 is configured to monitor the statuses of respective sets of communications connections for the transmission of information from the first monitor 212 to the other monitors 222, 232, 242. If the third detector 236 determines that all of the sets of communications connections from the first monitor 212 to its peers are inoperative, then the third monitor 232 determines that the first DC 210 is unavailable.

In more detail, in this example, the third monitor 232 is configured to receive heartbeats from the first monitor 212 over a first communications channel via the second network 262. These heartbeats are recorded in the third database 234, as described above, and, in the manner described above for the first detector 216, the third detector 236 is configured to detect when the first communications channel carrying heartbeats from the first monitor 212 to the third monitor 232 becomes inoperative, by determining when the timeout threshold is exceeded. The third monitor 232 also is configured to record in the second database 224 the readability of a location in the first database 214 via a second, read-only, communications connection which allows the third monitor 232 to inspect the location in the first database 214. The third detector 236 is configured to use this information stored in the third database 234 by the third monitor 232 to determine the overall status of the set of communications channels over which the third monitor 232 is configured to receive information from the first monitor 212.

As has also been described above, the second monitor 222 and the fourth monitor 242 are also configured to receive heartbeats from the first monitor 212 over respective first communications channels and to record the receipt of these heartbeats in their respective databases 224, 244. Similarly, the second monitor 222 and the fourth monitor 242 are configured to record in their respective databases 224, 244 an indication of whether they are able to inspect a location in the first database 214. To determine the respective statuses of the sets of communications connections from the first monitor 212 to the second monitor 222 and from the first monitor 212 and the fourth monitor 242, the third monitor 232 is configured to access these records in the second and fourth databases 224, 244.

In an example, the third monitor 232 obtains, from the second database 224, the record of heartbeats received by the second monitor 222 from the first monitor 212. The third monitor 232 also obtains, from the second database 224, the record of whether the location in the first database 214 is readable according to the second monitor 232. The third monitor 232 may store the information obtained from the second monitor 222 regarding its set of connections to the first monitor 212 in the third database 234. Based on this information, the third detector 236 then determines the status of the set of communications connections from the first monitor 212 to the second monitor 222. Similarly, in this example, the third monitor 232 obtains, from the fourth database 232, the record of heartbeats received by the fourth monitor 242 from the first monitor 212 and the record of whether the location in the first database 214 is readable according to the fourth monitor 232. The third monitor 232 stores this information in the third database 234. The third detector 236, based on this information, may then determine the status of the set of communications connections from the first monitor 212 to the fourth monitor 232.

Based on the determination of the statuses of the respective sets of communications connections from the first monitor 212 to the second, third and fourth monitors 222, 232, 242, the third detector 236 determines the availability of the first DC 210. Similarly to the manner described above in which the first detector 216 may determine the availability of the first DC 210, the third detector 236, in examples, determines that the first DC 210 is unavailable only if it determines that all of the sets of communications connections between the first monitor 212 and its peers are inoperative.

Responsive to the third detector 236 determining that the first DC 210 is unavailable, one or more actions may be taken at the third DC 230. Such actions may be taken, for example, by the third monitor 232. In one example, such an action may involve initiating failover of functionality of the first DC 210 to a failover DC, for example, the second DC 220. In one such example, the third monitor 232 initiates failover of the functionality of the first DC 210 to the second DC 220 by sending a message to the second monitor 222. The message may, for example, inform the second monitor 222 that the first DC 210 has become unavailable and instruct the second monitor 222 that the second DC 220 should take over certain functionality which was being performed by the first DC 210. This may allow the second DC 220 to quickly receive an indication that the first DC 210 is unavailable and begin taking over the relevant functionality from the first DC 210. The functionality initiated at the second DC 220 may, for example, include running one or more applications, in place of the first DC 210, which are configured to be controlled by the first computing entity 250 and which are configured to communicate with the second computing entity 260. The second monitor 222 may, for example, responsive to receipt of a message from the third monitor 232, initiate versions of one or more applications which were previously being run at the first DC 210. Alternatively, or additionally, the second monitor 222 may cause one or more applications running at the second DC 220 to be modified to include one or more functions of applications which were running at the first DC 210. For example, the second monitor 222 may initiate or modify applications running at the second DC 220 to communicate with the first and/or second computing entities 250, 260. An example of a failover DC, in this manner, taking over functionality of a first DC which is determined to be unavailable will be described below with reference to FIG. 3.

As an alternative to the automatic failing over of functionality of the first DC 210 to another DC, failover from the first DC 210 may be handled manually. For example, the third monitor 232 may, responsive to determining that the first DC 210 is unavailable, issue an alert. Responsive to receipt of such an alert, a user may manually initiate a failover procedure for failing over the functionality of the first DC 210, for example, to the second DC 220.

In examples, if at least one of the sets of communications connections from the first monitor 212 to its peers remains operative, then the third detector 236 does not determine that the first DC 210 is unavailable. Action may nevertheless be taken if one or more of the sets of communications connections from the first monitor 212 to one of its peers is determined by the third detector 236 to be inoperative. For example, the third detector 236 may issue an alert that communication between the first DC 210 and one or more of its peers may have been lost.

In some examples, the third monitor 232 may determine based on the respective statuses of its sets of communications connections with its peers that it has lost connectivity to more than one of its peers. In such an example, the third monitor 232 may issue an alert to allow a user to investigate the situation and take action in response.

In examples described above, the techniques are applied to determine the availability of the first DC 210 in the system 200. However, it will be appreciated that similar techniques may be applied, additionally, or alternatively, to determine the availability of each of the DCs in the system 200. For example, a technique similar to that performed at the first DC 210 to determine its own availability to one or more external computing entities may be applied at each of the DCs 210, 220, 230, 240. For example, the second detector 226 of the second DC 220 may determine the availability of the second DC 220 based on statuses of respective sets of communications from the first, third and fourth monitors 212, 232, 242 to the second monitor 222. Moreover, the third detector 236 may determine the availability of the second DC 220 and/or the fourth DC 240 in a similar manner to how the third detector 236 determines the availability of the first DC 210. For example, if the second DC 220 is to act as a failover DC for functionality performed by the first DC 210, the third detector 236 may monitor the availability of the second DC 220 in addition to that of the first DC 210. In this manner, the third detector 230 is able to determine, in circumstances where the first DC 210 becomes unavailable, that the second DC 220 remains available to take over functionality from the first DC 210. The action taken by the third monitor 232 responsive to determining that the first DC 210 is unavailable may then be dependent on whether the third detector 236 determines that the second DC 220 is available. For example, the third monitor 232 may only initiate failover to the second DC 220 only if it determines that the second DC 220 is available.

In examples, redundancy of the above-described functionality of the third DC 230 may be provided by one or more further DCs, such as the fourth DC 240. For example, as described above, the third detector 236 may determine the availability of the first DC 210, and in response to determining that the first DC 210 is unavailable, take one or more actions such as initiating failover of functionality of the first DC 210 to a failover DC, for example, the second DC 220. However, in examples, a further DC such as the fourth DC 240 may, in a similar way to as described above for the third DC 230, determine the availability of the first DC 210. For example, the fourth detector 246 and the fourth monitor 242 may act to determine the availability of the first DC 210, in a similar manner to that described above for the third monitor 232 and the third detector 236. In such cases, in response to determining that the first DC 210 is unavailable, the further DC may take one or more actions such as initiating failover of functionality of the first DC 210 to a failover DC, for example, the second DC 220. This redundancy may ensure that, in cases where the third DC 230 becomes unavailable, the unavailability of the first DC 210 may nonetheless be detected, and appropriate action taken in response, such as initiating failover of the first DC 210 to the second DC 220.

In examples, the further DC, such as the fourth DC 240, may provide the above-mentioned functionality of the third DC 230 in response to a determination that the third DC 230 has become unavailable. In these cases, the availability determination and failover initiation functionality of the third DC 230 may be failed over to the further DC, such as the fourth DC 240. This may enable this functionality to be provided even where the third DC 230 has become unavailable. The availability of the third DC 230 may be determined in any suitable manner, including using the techniques described above with reference to FIG. 2. For example, the fourth DC 240 may determine the availability of the third DC 230 in the same or similar way as the third DC 230 determines the availability of the first DC 210 as described above. As another example, the third DC 230 may also be part of a further plurality of DCs (not shown) that includes another further DC (not shown) that determines the availability of the third DC 230 and initiates failover of the above-described functionality of the third DC 230 to the fourth DC 240. This other further DC may determine the availability of the third DC 230 and initiate failover of the functionality of the third DC 230 to the fourth DC 240 in a similar manner to that described above by which the third DC 230 determines the availability of the first DC 210 and initiates failover of functionality of the first DC 210 to the second DC 220.

In examples, the third DC 230 may form a part of cloud computing resources provided in a first geographical region, and the further DC, such as the fourth DC 240, may form a part of cloud computing resources provided in a second, different, geographical region. The first and second geographical regions may, for example, be different parts of a country or continent or different countries or continents. This may provide that if the cloud computing resources in the first geographical region become unavailable the above-described functionality of the third DC 230 can be failed over to the further DC, such as the fourth DC 240, of the cloud computing resources in the second geographical region. Cloud computing resources in the second geographical region may be relatively isolated from factors that may cause unavailability of the cloud computing resources in the first geographical region, such as regional power or communications failures. For example, cloud computing resources provided in the different geographical regions may be provided by independent infrastructure. This may allow for improved reliability for the functionality intended to be provided by the third DC 230.

IV. CONTROLLING APPLICATIONS AT A DATA CENTER

As described above, in some examples, following a determination that the first DC 210 is no longer available to one or more external computing entities, one or more actions may be taken at the first DC 210. As example of such actions taken at the first DC 210 is described in more detail with reference to FIG. 3.

Figure 3:
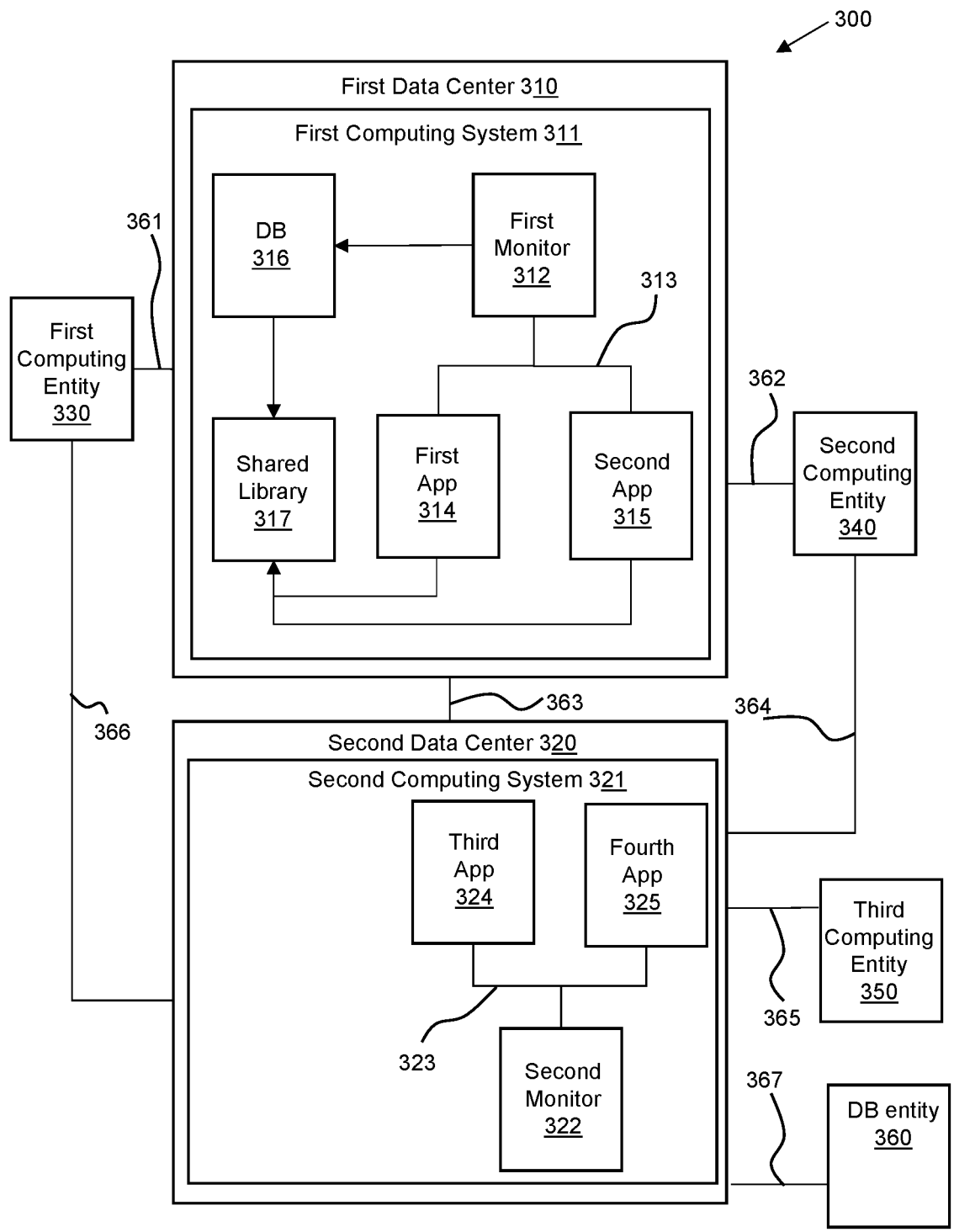
FIG. 3 is a block diagram showing an example system in which an example method of controlling applications at a data center may be implemented.

FIG. 3 illustrates an example system 300. The system 300 includes a first data center, DC, 310 a second DC 320, a first computing entity 330, a second computing entity 340, a third computing entity 350, and a database entity 360. The first DC 310 includes a first computing system 311, which includes a first monitor 312, an internal communications network 313, a first application, app, 314, a second app 315, a database 316, and a shared library 317. The first DC 310 may be the first DC 210 described above with reference to FIG. 2. The first computing system 311 may be the first computing system 211 of the first DC 210 described above with reference to FIG. 2. The first monitor 312 may be the first monitor 212 of the first DC 210 described above with reference to FIG. 2. The database 316 may be the first database 214 described above with reference to FIG. 2. The second DC 320 includes a second computing system 321, which includes a second monitor 322, an internal communications network 323, a third app 324 and a fourth app 325. The second DC 320 may be the second DC 220 described above with reference to FIG. 2. The second computing system 321 may be the second computing system 221 of the second DC 220 described above with reference to FIG. 2. The second monitor 322 may be the second monitor 222 of the second DC 220 described above with reference to FIG. 2.

The first computing entity 330 is in communication with the first DC 310 over a first communications network 361. The first DC 310 is in communication with the second computing entity 340 over a second communications network 362. The first DC 310 is in communication with the second DC 320 over a third communications network 363. The second DC 320 is in communication with the second computing entity 340 over a fourth communications network 364. The second DC 320 is in communication with the third computing entity 350 over a fifth communications network 365. The first computing entity 330 is in communication with the second DC 320 over a sixth communication network 366. The second DC 320 is in communication with the database entity 360 over a seventh communication network 367. In examples, one or more of the first to seventh communications networks 361-367 may include one or more of a local area network, a wide area network, a multicast network, a wireless network, a virtual private network, an internal network, a cellular network, a peer-to-peer network, a point-of-presence, a dedicated line, the Internet, a shared memory system, and/or a proprietary network. One or more of the first to seventh communications networks 361-367 may be different from one another or may be the same network.

In a similar manner to that described above with reference to FIG. 2, the first computing system 311 of the first DC 310 may be implemented by or otherwise include one or a plurality of the computing devices 100 described above with reference to FIG. 1. One or both of the first app 314 and the second app 315 may be implemented as software executed on one or more computing devices (for example, the computing device 100 described above with reference to FIG. 1) of the first computing system 311. For example, the first app 314 and the second app 315 may be executed on respective different computing devices (for example, the computing device 100 described above with reference to FIG. 1) of the computing system 311, although it will be appreciated that this need not necessarily be the case and other configurations are possible.

The first app 314 and the second app 315 are configured to perform one or more functions. For example, the functions may include processing data, routing data to one or more other applications, establishing one or more communications connections with a computing entity, and/or sending data to and/or receiving data from a computing entity. In this example, the first app 314 is configured to process data and route the processed data to the second app 315 over the internal communications network 313. The second app 315 is configured to establish one or more connections, such as TCP connections, with the second computing entity 340 over the second communications network 362. The second app 315 receives data from the first app 314, further processes the data, and sends the further processed data to the second computing entity 340 over the established one or more connections. The second computing entity 340 may take an action based on the data sent by the second app 315. Accordingly, functions carried out by the first app 314 and/or the second app 315 may cause actions to be taken by the second computing entity 340. In some examples (as illustrated in FIG. 3) the second computing entity 340 may be external to the first DC 310. However, in other examples (not shown), the second computing entity 340 may be part of the first DC 310, that is, co-located with the first computing system 311.

One or both of the first app 314 and the second app 315 are remotely controllable by the first computing entity 330. The first computing entity 330 is external to the first DC 310. Under normal or expected operating conditions, the apps 314, 315 of the first DC may be remotely controlled by the first computing entity 330. For example, the first computing entity 330 may send commands, via the first communications network 361, to one or more of the apps 314, 315 in order to control operation of the apps 314, 315. This control may include, for example, one or more of initiating execution of an app 314, 315 at the first DC 310, starting, changing, or stopping a function performed by an app 314, 315, and shutting down an app 314, 315. For example, it may not be feasible or practical or otherwise desired to store or execute the apps 314, 315 on the first computing entity 330. In this case, the apps 314, 315 are instead stored and executed by the first computing system 311 of the first data center 310, but operate under the control of the first computing entity 330. As another example, it may be beneficial or otherwise desired that the apps 314, 315 execute on a computing device that is located physically close to the second computing entity 340, in order that latency of communications between the apps 314, 315 and the computing entity 340 is minimized. The first computing entity 330 may not be located physically close to the second computing entity 340. However, the first computing system 311 may be located physically close to, or be co-located with, the second computing entity 340. In this case, the apps 314, 315 are stored and executed by the first computing system 311 of the first data center 310 in order to minimize latency of communications between the apps 314, 315 and the second computing entity 340, while operating under the control of the first computing entity 330.

However, as described with reference to FIG. 2, a situation may arise in which the first DC 310 is no longer available to the first computing entity 330. In such a situation, the apps 314, 315 may no longer be controllable by the first computing entity 330. For example, this may occur where the first DC 310 loses connection to the first communication network 361, or experiences some other disaster or failure, be that of hardware or software, that prevents commands from the first computing entity 330 from reaching the apps 314, 315. In cases where the apps 314, 315 are no longer controllable by the first computing entity 330, the apps 314, 315 may continue to execute, or start to execute, at the first DC 310 without control by the first computing entity 330. For example, the second app 315 may continue sending or start to send data to the second computing entity 340 over a communications connection established on the second communications network 362, and the first computing entity 330 may no longer be able to change or stop this. This can be an undesirable situation as this may cause actions to be taken by the second computing entity 340 that the first computing entity 330, had it had control over the apps 314, 315, would have controlled the apps 314, 315 to avoid causing.

The first monitor 312 is configured to obtain an indication that that the apps 314, 315 at the first DC 310 are no longer controllable by the first computing entity 330 external to the first DC 310. The first monitor 312 may obtain the indication responsive to a determination, for example, according to any of the examples described above with reference to FIG. 2, that the first DC 310 is no longer available to the one or more computing entities external to the first DC 310. An indication of the determination may, for example, be obtained by the first monitor 312 from a first detector 216 of FIG. 2 (not shown in FIG. 3). The first detector 216 may, for example, make the determination that the first DC 210 is not available and store an indication of this determination in a database accessible by the first monitor 312, for example, the database 316.

The first monitor 312 is configured to determine, based on the indication that the apps 314, 315 are no longer controllable by the first computing entity 330, that the apps 314, 315 are to operate in a disaster recovery mode. For example, as described in more detail below, depending on the app 314, 315, operating in the disaster recovery mode may include stopping or preventing one or more of the functions of the app 314, 315 from being performed, hence mitigating consequences of the apps 314, 315 continuing or starting to perform one or more of their functions without the external control by the first computing entity 330. In examples, the determination by the first monitor 312 that the apps 314, 315 are to operate in a disaster recovery mode may be responsive to the determination that the apps 314, 315 are no longer controllable by the first computing entity 330. This may allow for the time during which the apps 314, 315 are operating in a normal operating mode but not controllable by the first computing entity 330 to be minimized.

The first monitor 312 is configured to, in response to the determination that the apps 314, 315 at the first DC 310 are to operate in a disaster recovery mode, cause an indication that the apps 314, 315 are operate in the disaster recovery mode to be communicated to the apps 314, 315. As described in more detail below, the first monitor 312 causes this indication to be communicated to apps 314, 315 that are already executing at the first DC 310 when the determination is made, and to apps 314, 315 that start to execute at the first DC 310 after the determination is made. This helps ensure that apps 314, 315 at the first DC 310 operate in a disaster recovery mode, even if the apps 314, 315 start to execute after the determination is made.

In this example, the first monitor 312 is configured to write data to the database 316. The database 316 is stored in storage of the first computing system 311. For example, the database 316 may be stored in memory of a computing device (for example, the memory 114 of a computing device 100 described above with reference to FIG. 1) of the first computing system 311. In examples, the computing device at which the database 316 is stored may be different to the computing device(s) implementing the first app 314, second app 315, and/or the first monitor 312, although it will be appreciated that this need not necessarily be the case and that other configurations are possible.

In this example, the database 316 stores data at locations identified by respective paths, in the same manner as described above for the first database 214 of the first DC 210. The database 316 includes a specific disaster recovery, DR, path that records data indicative of whether or not the apps 314, 316 are to operate in a disaster recovery mode. For example, the DR path may record "false" where the apps 314, 315 are to operate normally, that is, not in a disaster recovery mode, and may record "true" where the apps 314, 315 are to operate in a disaster recovery mode. The database 316 is configured to provide callbacks to the shared library 317 whenever the data recorded at the DR path is updated. Specifically, the shared library 317 subscribes to the database 316 to receive updates whenever the data at the DR path is updated. Whenever the data recorded at the DR path is updated, the database 316 sends a callback to the shared library 317 indicating that an update has occurred and the updated data recorded at the DR path.

In response to the determination that the apps 314, 315 at the first DC 310 are to operate in a disaster recovery mode, the first monitor 312 writes data representing the indication that the apps 314, 315 are to operate in the disaster recovery mode to the database 316. Specifically, the first monitor 312 accesses the DR path at the database 316 and writes data representing the indication that the apps 314, 315 are to operate in the disaster recovery mode. Specifically, the first monitor 312 may overwrite "false" recorded at the DR path of the database to "true". The database 316 sends a callback to the shared library 317 indicating the update to the DR path, specifically that the data at the DR path has been updated to "true". Accordingly, the indication that the apps 314, 315 are to operate in the disaster recovery mode is communicated to the shared library 317.

The shared library 317 is stored in storage of the first computing system 311. For example, the shared library 317 may be stored in memory of a computing device (for example, the memory 114 of a computing device 100 described above with reference to FIG. 1) of the first computing system 311. In examples, the computing device at which the shared library 317 is stored may be different to the computing device(s) implementing the first app 314, second app 315, the first monitor 312 and/or the database 316, although it will be appreciated that this need not necessarily be the case and that other configurations are possible. The shared library 317 is used by the apps 314, 315 at the first DC 310. For example, the library 317 may be a library that is shared by the apps 314, 315. The shared library 317 may be accessible by the apps 314, 315. The shared library 317 may be a location in storage that the apps 314, 315 are configured to access. The apps 314, 315 may be configured to access the shared library 314, 315 when starting to execute at the first DC 310 and when executing at the first DC 310.

The shared library 317 includes a disaster recovery, DR, function that the apps 314, 315 are configured to call. In one example the apps 314, 315 are each configured to call the DR function in the shared library 317 when starting to execute at the first DC 310. The apps 314, 315 may also each be configured to call the DR function in the shared library 317 when executing at the first DC 310, for example periodically during execution. Specifically, each app 314, 315 includes code that calls the DR function in the shared library 317. For example, the DR function may be "IsDREnabled( )". Each app 314, 315 may be configured such that when the app 314, 315 calls the DR function and the argument is set to "false", that is, the DR function is "IsDREnabled(false)", then the app 314, 315 operates in a normal operating mode. However, when the app 314, 315 calls the DR function and the argument is set to "true", that is, the DR function is "IsDREnabled(true)", then the app 314, 315 operates in a disaster recovery mode. The shared library 317 may be configured to modify the DR function in response to receiving callbacks from the database 316. Specifically, the shared library 317 may be configured to write the argument of the DR function to "true" in response to receiving a callback from the database 316 indicating that the data at the DR path at the database 316 has been updated to "true".

Accordingly, in this example, when the first monitor 312 determines that the apps 314, 315 at the first DC 310 are to operate in a disaster recovery mode, the first monitor 312 writes the data recorded at the DR path of the database 316 to indicate "true". This causes the database 316 to send a callback to the shared library 317 indicating that the data at the DR path has been updated to "true". This, in turn, causes the shared library 317 to write the argument of the DR function of the shared library 317 to "true". Apps 314, 315 already executing when the determination is made, as well as apps 314, 315 that start to execute after the determination is made, will call the DR function from the shared library 317. The indication that the apps 314, 315 are to operate in a disaster recovery mode is caused to be communicated to apps 314, 315 already executing when the determination is made as well as to apps 314, 315 that start to execute at the first DC 310 after the determination is made. Data representing the indication may be caused to be written to a location in storage (that is, the shared library) that apps 314, 315 are configured to access when starting to execute at the first DC and that apps 314, 315 and when executing at the first DC 310. In some arrangements, a function (that is, the DR function) that the apps 314, 315 call from a library (that is, the shared library 317) when starting to execute at the DC 310 and when executing at the DC 310 is caused to be modified so as to represent the indication.

In this example, the first monitor 312 is in communication with the first app 314 and the second app 315 over the internal communications network 313. The internal communications network 313 may be, for example, a local area network. The internal communications network 313 may be configured for multicast messaging. For example, the first app 314 and the second app 315 may subscribe to multicast messages transmitted by the first monitor 312 over the internal communications network 313. In this example, the first monitor 312 is configured to, in response to a determination that the apps 314, 315 are to operate in a disaster recovery mode, transmit a message, including data representing the indication that the apps 314, 315 are to operate in a disaster recovery mode, to one or more apps 314, 315 that are already executing at the DC. For example, this message may be a multicast message. For example, the apps 314, 315 may be configured to, when starting to execute, subscribe to receive multicast messages from the first monitor 312. Accordingly, the apps 314, 315 already executing when the determination is made may receive a multicast message from the first monitor indicting that the apps 314, 315 are to operate in a disaster recovery mode. Accordingly, the indication is caused to be communicated to the apps 314, 315 already executing at the DC 310 when the determination is made. The apps 314, 315 are configured to, in response to receiving such a message from the first monitor 312, operate in the disaster recovery mode.

In examples, the first monitor 310 may cause the indication to be communicated to an app 314, 315 already executing at the first DC 310 by way of the shared library 317 and by way of the message sent over the internal communications network 313. In this case, the app 314, 315 may operate in the disaster recovery mode in response to whichever is received first. For example, if the app 314, 315 happens to call the DR function from the shared library 317 after the DR function has been modified to represent the indication but before the message representing the indication is received, the app 314, 315 may operate in the disaster recovery mode in response to calling the DR function. On the other hand, if the app 314, 315 happens to receive the message representing the indication in-between calls to the DR function from the shared library 317 and before the DR function has been modified to represent the indication, the app 314, 315 may operate in the disaster recovery mode in response to receiving the message.

Each app 314, 315 is configured to obtain the indication, caused to be communicated by the first computing system 311 of the first DC 310, that the apps 314, 315 are to operate in a disaster recovery mode. For example, for an app 314, 315 that starts to execute after the first monitor 312 determines that the apps 314, 315 are to operate in the disaster recovery mode, the app 314, 315 may obtain the indication by, when starting to execute, accessing a location in storage at which data representing the indication is stored to read the data. For example, the app 314, 315 may, when starting to execute, access the shared library 317 to call the DR function (whose argument has been written to "true") from the shared library 317. For an app 314, 315 that is already executing when the first monitor 312 determines that the apps 314, 315 are to operate in the disaster recovery mode, the app 314, 315 may obtain the indication by, during execution of the app 314, 315, accessing the location in storage to read the data representing the indication. For example, the app 314, 315 may, during execution of the app 314, 315, access the shared library 317 to call the DR function (whose argument has been written to "true") from the shared library 317. Alternatively the app 314, 315 may obtain the indication by, during execution of the app 314, 315, receiving the message from the first monitor 312 over the internal communications network 313.

Each app 314, 315 is configured to, in response to obtaining the indication that the apps 314, 315 are to operate in a disaster recovery mode, operate the application in a disaster recovery mode. For example, depending on the app 314, 315, operating in the disaster recovery mode may include stopping or preventing one or more of the functions of the app from being performed.

As an example, as mentioned above, during normal operation, the first app 314 may process data and route the processed data to the second app 315 over the internal communications network 313. The second app 315 may receive the processed data from the first app 314, and further process the data. The second app 315 may establishes one or more communications connections with the second computing entity 340 over the second communications network 362 and send data the further processed data to the second computing entity 340 over the communications connections.

In this example, where the second app 315 is already executing at the first DC 310, operating the second app 315 in the disaster recover mode may include ceasing the further processing of the data by the second app 315 and/or terminating the one or more established communications connections. Alternatively, where the second app 315 starts to execute after the determination is made, operating the second app 315 in the disaster recovery mode may include preventing the second app 315 from further processing the data and/or preventing the second app 315 from establishing the communications connections to the second computing entity 340. In either case, this stops the second app 315 from sending data to the second computing entity 340, and hence prevents actions being taken by the second computing entity 340 based on data sent by the second app 315 whilst the apps 314, 315 are not controllable by the first computing entity 330. Where the second computing entity 340 only allows one set of such communications connections at a time, terminating or preventing the communication connections may allow for such communication connections to be established with the second computing entity 340 instead from an app 325 at the second DC 320, which, as described in more detail below, may facilitate effective failover of the second app 315 of the first DC 310. Further, where the further processing of the data should only be performed once, ceasing or preventing the further processing by the second app 315 may allow for such further processing to be performed instead by an app 325 at the second DC 320, which, as described in more detail below, may facilitate effective failover of the second app 315 of the first DC 310.

In this example, where the first app 314 is already executing at the first DC 310, operating the first app 314 in the disaster recovery mode may include ceasing the processing of data by the first app 314 and/or ceasing the routing of data by the first app 313 to the second app 315. Alternatively, where the first app 314 starts to execute after the determination is made, operating the first app 314 in the disaster recovery mode may include preventing the first app 314 from processing the data and/or preventing the first app 314 from routing the data to the second app 315. In either case, this stops the first app 314 from sending data to the second app 315, which, in turn, prevents the second app 315 further processing such data and sending the further processed data to the second computing entity 340, and hence prevents actions being taken by the second computing entity 340 based on the processing and/or routing performed by the first app 314 whilst the apps 314, 315 are not controllable by the first computing entity 330. Where the processing and/or routing of data should only be performed once, ceasing or preventing the processing or routing by the first app 314 may allow for such processing and/or routing to be performed instead by an app 324 at the second DC 320, which, as described in more detail below, may facilitate effective failover of the first app 314 of the first DC 310.

As another example, operating the first app 314 and/or the second app 315 in a disaster recovery mode may include shutting down the app 314, 315. For example, where the app 314, 315 is already executing at the first DC 310, operating the app in the disaster recovery mode may include shutting down the app 314, 315 to stop the functions of the app 314, 315 from being performed. Where the app 314, 315 is starting to execute at the first DC 310, operating the app in the disaster recovery mode may include shutting down the app 314, 315 before functions of the app 314, 315 are performed. This may help prevent any actions being taken by the second computing entity 340 based on the functions performed by the apps 314, 315 whilst the apps 314, 315 are not controllable by the first computing entity 330. Where the functions should only be performed once (that is, by one application), shutting down the app 314, 315 may allow for the functions to be performed instead by an app 324, 325 at the second DC 320, which, as described in more detail below, may facilitate effective failover of the apps 314, 315 of the first DC 310.

Turning now to the second DC 320, as described above, the second DC 320 may be the second DC 220 of FIG. 2. The second DC 320 may be in a different city or country to the first DC 310. The second DC 310 may be physically close to the third computing entity 350. In examples, the second computing system 321 may be co-located with the third computing entity 350 in the second DC 320. The second computing system 321 may be implemented by or otherwise include one or a plurality of the computing devices 100 described above with reference to FIG. 1. One or more of the third app 324, the fourth app 325, and the second monitor 322 may be implemented as software executed on one or more computing devices (for example, the computing device 100 described above with reference to FIG. 1) of the second computing system 311. For example, the third app 324, the fourth app 325, and the second monitor 322 may be executed on respective different computing devices (for example, the computing device 100 described above with reference to FIG. 1) of the second computing system 321, although it will be appreciated that this need not necessarily be the case and other configurations are possible.

The third app 324 and the fourth app 325 perform functions. In examples, the functions that the third app 324 and the fourth app 325 are configured to perform may be the same or simar to the functions that the first app 314 and the second app 315, respectively, are configured to perform. For example, the third app 324 and the fourth app 325 may be configured to perform the same or similar functions with respect to the third computing entity 350 as the first app 314 and the second app 315, respectively, are configured to perform with respect to the second computing entity 340. The third app 324 and the fourth app 325 are controllable by one or more computing entities external to the second DC 320. For example, the third app 324 and the fourth app 325 may be remotely controllable by the first computing entity 330.

As described in more detail below, in cases where the first app 314 and the second app 315 are no longer remotely controllable by the first computing entity 330, the third app 324 and/or the fourth app 325 of the second DC 320 may provide a failover of the first app 314 and/or the second app 315, respectively of the first DC 310. In examples, the third app 324 and/or the fourth app 325 may provide a failover of the first app 314 and/or the second app 315, respectively, by performing functions of the first app 314 and/or the second app 315, respectively, in addition to functions that the third app 324 and/or the fourth app 325 anyway perform. In other examples, the third app 324 and/or the fourth app 325 may start to execute at the second computing system 321 in order to provide a failover of the first app 314 and/or the second app 315, respectively.

The second monitor 322 is configured to obtain an indication that that the apps 314, 315 at the first DC 310 are no longer controllable by the first computing entity 330 external to the first DC 310. As described above with reference to FIG. 2, obtaining the indication that applications at the first DC 310 are no longer controllable by the first computing entity 330 may include the second monitor 322 receiving an indication that the first DC 310 is unavailable, for example, in the form of a message from a third DC (not shown in FIG. 3) such as the third DC 230 of FIG. 2. Alternatively, obtaining the indication that applications at the first DC 310 are no longer controllable by the first computing entity 330 may include the second monitor 322 determining that the first DC 310 is not available, also in the manner described above in certain examples described with reference to FIG. 2.

The second monitor 322 is configured to determine, based on the obtained indication, that the second DC 320 is to provide a failover for the first DC 310. For example, as described in more detail below, the third app 324 and/or the fourth app 325 may provide a failover for the first app 314 and/or the second app 315, respectively. In examples, the determination by the second monitor 322 that the second DC 320 is to provide a failover for the first DC 310 may be responsive to the determination that the apps 314, 315 at the first DC 310 are no longer controllable by the first computing entity 330. This may allow for the time in which the failover is provided to be minimized. In examples, the determination that the second DC 320 is to provide a failover for the first DC 310 may include the second monitor 322 determining that the second DC 320 is the DC (among a plurality of further DCs, not shown in FIG. 3) that is designated to provide a failover for the first DC 310.

The second monitor 322 is configured to, in response to the determination that the second DC 320 is to provide a failover for the first DC 310, cause the third app 324 and/or the fourth app 325 at the second DC 320 to operate in a failover mode to provide a failover for the first app 314 and/or the second app 315, respectively, at the first DC 310. In examples, causing the app 324, 325 to operate in a failover mode may include causing an indication that the apps 324, 325 are to operate in a failover mode to provide a failover for apps 314, 315 of the first DC 310, to be communicated to the apps 324, 325. For example, this indication may be communicated by issuing a command to the apps 324, 325 that they are to operate in the failover mode. As another example, this indication may be communicated by transmitting a message, over the internal communications network 323, to the apps 324, 325, including data representing the indication. In examples, one or both of the apps 324, 325 may not be executing at the second DC 320 when the determination is made. In these examples, causing the app 324, 325 to operate in a failover mode may include issuing a command to start execution of the app 324, 325. In examples, the command and/or the message may include an indication of the identity of the first DC 310 for which the apps 324, 325 are to provide the failover.

The third app 324 and/or the fourth app 325 are configured to, in response to receiving the indication from the second monitor 322, operate in a failover mode to provide a failover for the first app 314 and/or the second app 315, respectively. For example, for the third app 324, operating in the failover mode may include performing one or more of the functions of the first app 314. For example, the third app 324 may perform the processing of data and/or routing of processed data otherwise performed by the first app 314. As another example, for the fourth app 325, operating in the failover mode may include performing one or more of the functions of the second app 315. For example, the fourth app 325 may establish communications connections with the second computing entity 340 otherwise established by the second app 315.

In some examples, the third app 324 and/or the fourth app 325 may query the database entity 360 to determine information relating to the operation of the first app 314 and/or the second app 315, respectively. The third app 324 and/or the fourth app 325 may use this information to perform the functions of, and hence provide a failover for, the first app 314 and/or the second app 315, respectively. For example, the third app 324 and/or the fourth app 325 may query the database entity 360 to determine information relating to the most recent operation of the first app 314 and/or the second app 315, respectively. For example, as mentioned above, the second app 315 of the first DC may have established a number of communications connections to the second computing entity 340 over the second communications network 362, but as part of the disaster recovery mode at the first DC 310, these communications connections may have been terminated by the second app 315. The fourth app 325, in order to provide a failover for the second app 315, may query the database entity 360 to determine information indicative of the communications connections that were (or should have been) established by the second app 315 with the second computing entity 340, and re-establishes these communication connections with the second computing entity 340 over the fourth communications network 364. As another example, as mentioned above, the first app 314 may process and output data, but as part of the disaster recover mode at the first DC 310, may no longer processes or output data. The third app 324, in order to provide a failover for the first app 315, may query the database entity 360 to determine information indicative of the most recent output of the first app 314. From this, the third app 324 may infer a state of the first app 315 when the first app 315 was shut down and may initiate the third app 324 in this state. The third app 324 may then process data based on this state, and hence continue to perform the function otherwise provided by the first app 314.

In some examples, the third app 324 and/or the fourth app 325 may perform one or more functions, in whole or in part, that are also performed by the first app 314 and/or the second app 315, respectively. In these examples, operating the third app 324 and/or the fourth app 325 in a failover mode may include activating the function. For example, under normal operation, the first app 314 may process first data and route the processed first data to the second app 315, which, however, may be ceased by operation in a disaster recovery mode. Under normal operation, the third app 324 may also processes the first data in the same way as the first app 314, but not route the processed first data to the fourth app 325. In these examples, operating the third app 324 in the failover mode may include activating the routing of the processed second data to the fourth app 325 by the third app 324. This may provide for a particularly fast failover of the functions of the first app 314 to the third app 324.

As described above, by the actions of the second monitor 322 and the apps 324, 325, the second DC 320 may provide a failover for the first DC 310. The apps 324, 325 of the second DC 320 are remotely controllable by the first computing entity 330. For example, the second DC 320 may communicate, to the first computing entity 330, over the sixth communication network 366, an indication that the second DC 320, specifically the apps 324, 325 thereof, are providing a failover for the first DC 310, specifically the apps 314, 315 thereof. The second DC 320 is available to the first computing entity 330, and hence the apps 324, 325 thereof are remotely controllable by the first computing entity 330. For example, whereas the first communications network 361 may be non-functional, and/or a component of the first DC 310 may be experiencing a failure or disaster that prevents the apps 314, 315 from being controlled by the first computing entity 330, the second communications network 366 and the second data center 320 may be functioning normally, allowing the failover apps 324, 325 at the second DC 320 to be remotely controlled by the first computing entity 330. Accordingly, functions of the apps 314, 315 of the first DC 310 may be continued, specifically by the apps 324, 325 of the second DC, in a way that is controllable by the first computing entity 330, even where the apps 314, 315 of the first DC 310 are no longer controllable by the first computing entity 330.

V. VARIATIONS

In the example system 200 described above with reference to FIG. 2, the system 200 includes four DCs 210, 220, 230, 240. However, this need not necessarily be the case, and another example system which operates in a similar manner may include only three DCs, or more than four DCs. For example, the fourth DC 240 may be omitted from the system 200. In such an example, the availability of the first DC 210 may be determined in a similar manner to that described above, except being based on the respective statuses of sets of communications connections between the first DC 210, the second DC 220 and the third DC 230. In such an example, the first detector 216 may determine that the first DC 210 is unavailable to the one or more computing entities external to the first DC 210 if both the respective sets of communications connections from the second monitor 222 to the first monitor 212 and from the third monitor 232 to the first monitor 212 are inoperative. Similarly, the third detector 236 may determine that the first DC 210 has become unavailable based on respective statuses of sets of communications connections from the first monitor 212 to the second monitor 222 and from the first monitor 212 to the third monitor 232. The third detector 236 may determine the respective statuses of these sets of communications connections from the first monitor 212 in the same manner as described above. In such examples, the third detector 226 may be configured to determine that the first DC 210 is unavailable to the one or more computing entities external to the first DC 210 if both the sets of communications connections from the first monitor 212 to the second monitor 222 and from the first monitor 212 to the third monitor 232 are inoperative.

In the example system 200, each of the sets of communications connections which allows one of the monitors 212, 222, 232, 242 to transmit information to another of the monitors 212, 222, 232, 242 includes a first communications connection and a second communications connection, which are of different types to one another. However, this need not necessarily be the case and, for example, as is briefly mentioned above, the sets of communications connections may each include only one communications connection, or may include more than two communications connections. Further, the sets of communications connections may include the same or different numbers of communications connections to one another. Moreover, the communications connections of a particular set of communications connections may include more than one communications connection of the same type. For example, a set of communications connections for transmitting information from one of the monitors 212, 222, 232, 242 to another of the monitors 212, 222, 232, 242 may include a first communications connection for transmitting first heartbeats and a second communications connection for transmitting second heartbeats. In such an example, the first communications connection and the second communications connection may, for example, be transmitted over separate paths, for example, over separate VLANs.

In the example system 200, for the third detector 236 to determine the availability of the first DC 210, the third monitor 234 is configured to obtain information from the second database 224 regarding the first and second communications connections from the first monitor 212 to the second monitor 222 and from the fourth database 244 regarding the first and second communications connections from the first monitor 212 to the fourth monitor 242. The third detector 226 may then determine the overall statuses of the respective sets of communications connections from the first monitor 212 to the second monitor 222 and from the first monitor 212 to the fourth monitor 242. However, this need not necessarily be the case, and, instead, one or more of the statuses of these sets of communications connections may be determined at the second DC 220 or the fourth 240 and communicated to the third monitor 232. For example, the second detector 226 may be configured to determine an overall status of the set of communications connections from the first monitor 212 to the second monitor 222. This status may be stored in the second database 224 and accessed by the third computing system 231, for example, by the third monitor 232. Similarly, the fourth detector 246 may be configured to determine an overall status of the set of communications connections from the first monitor 212 to the fourth monitor 242. This status may be stored in the fourth database 244 and accessed by the third computing system, again, for example, by the third monitor 232.

In certain examples of the system 200 described above, the third computing system 231 may act as a DC coordinator by determining the availability of the first DC 210 and/or availabilities of the other DCs 220, 240. However, this need not necessarily be the case and, for example, the second computing system 221 or the fourth computing system 241 may instead act as such a coordinator by monitoring the availability of the first DC 210 and, for example, taking action such as initiating failover to another DC when the first DC 210 becomes unavailable. For example, as described above, the fourth computing system 241 may act as such a coordinator in response to a determination that the third DC 230 has become unavailable, in order to provide a failover for the coordinator functionality of the third computing system 231 of the third DC 230. In other examples, none of the DCs 220, 230, 240 may perform such a coordinator role and, for example, instead, the DCs 220, 230, 240 may communicate with one another to determine and agree on the availability of the first DC 210 and any action to take in response to the first DC 210 becoming unavailable.

In the example system 200, particular functionality of the determining of the availability of a DC is performed by particular components of the computing systems 211, 221, 231, 241. For example, the monitors 212, 222, 232, 242 maintain the respective sets of communications connections with one another and the detectors 216, 226, 236, 246 are configured to make the determination of the availability of a particular data center. However, this need not necessarily be the case, and, more generally, the functions involved in determining the availability of a data center and, for example, taking any action in response to determining that a data center is unavailable, may be performed by the computing systems 211, 221, 231, 241, or any component thereof.

In the example system 300 described above with reference to FIG. 3, the first DC 310 has two apps 314, 315. However, it will be appreciated that this need not necessarily be the case and the first DC 310 may any number of apps, that is, one or more apps. In the examples system 300, the apps 314, 315 are remotely controllable by the first computing entity 330. However, it will be appreciated that one or more of the apps may be remotely controllable by any one or more computing entities external to the first DC 310, of which the first computing entity 330 is an example. In the example system 300, the first monitor 312 obtains the indication that the one or more apps 314, 315 are no longer remotely controllable by the one or more external computing entities 330, determines that the apps 314, 315 are to operate in a disaster recovery mode, and causes the indication to operate in a disaster recovery mode to be communicated to the apps 314, 315. However, it will be appreciated that this need not necessarily be the case, and that more generally the computing system 311, or any component thereof, may perform these functions.

In the example system 300, the indication is communicated to the apps 314, 316 using the shared library 317 and by messaging over the internal communications network 314, 315. However, it will be appreciated that this need not necessarily be the case, and that in other examples one or the other may be used. Further, in some examples, other ways of causing the indication to be communicated to the apps 314, 315 may be used instead. As one example, the apps 314, 315, rather than the shared library 317, may be configured to subscribe to receive callbacks from the DB 316, specifically from the DR path of the DB 316. In this case, when the first monitor 312 writes the data representing the indication to the DR path of DB 316, the DB 316 may send a callback to each app 314, 315. Each app 314, 315 may be configured to operate in the disaster recovery mode in response to receiving a callback indicating that the apps 314, 315 are to operate in a disaster recovery mode. As another example, each app 314, 315 may be configured to refer directed to the DR path of the DB 316, for example when starting to execute at the first DC 310 or during execution of the app at the first DC 310, for example periodically. In this case, the DR path of the DB 316 is an example of a location in storage which applications may be configured to access. In this case, each app 314, 315 may be configured to access this location in memory and read the data written there. If the data indicates that the apps 314, 315 are to operate in a DR mode, then the apps 314, 315. Other configurations are possible.

In the example system 300, the second DC 320 has two apps 324, 325. However, it will be appreciated that this need not necessarily be the case and the second DC 320 may any number of apps, that is, one or more apps 324, 325. Further, while in the example system 300 it is described that the third app 324 provides a failover for the first app 315 and the fourth app 325 provides a failover for the second app 325, it will be appreciated that this need not necessarily be the case, and more generally, one or more apps 324, 325 of the second DC 320 may provide a failover for one or more apps 314, 315 of the first DC 310. In the example system 300, the second monitor 322 obtains the indication that the one or more apps 314, 315 are no longer remotely controllable by the one or more external computing entities 330, determines that the second DC 320 is to provide a failover for the first DC 310, and causes one or more apps 324, 325 to operate in a failover mode. However, it will be appreciated that this need not necessarily be the case, and that more generally the computing system 321, or any component thereof, may perform these functions.

VI. EXAMPLE METHOD

Figure 4:
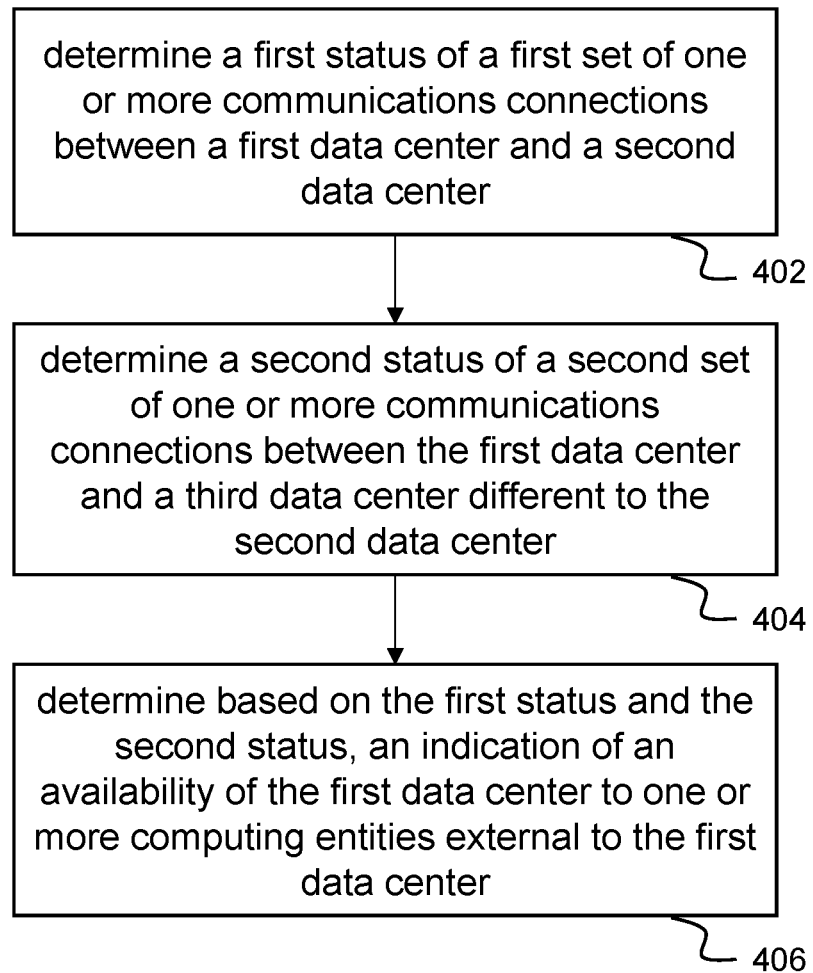
FIG. 4 is a flow diagram showing an example method for determining an availability of a data center.

FIG. 4 is a flow diagram illustrating a method according to an example of present disclosure. The method may be performed by a computing system, for example the first computing system 211 of FIG. 2, according to any of the examples described above with reference to FIG. 1 to FIG. 3. In examples, the computing system includes a processor (for example, the processor 112 of FIG. 1) and a memory (for example, the memory 114 of FIG. 1). The method may be performed by the processor. The processor may be configured to perform the method. The memory may store instructions which, when executed, cause at least one processor (for example, the processor 112 of FIG. 1) of a computing system to perform the method, or functions defined by the method. For example, the memory may store an application (for example, the application 130 of FIG. 1) including the instructions. The method is for determining the availability of a data center to one or more computing entities external to the data center. For example, the method may be applied to determine the availability of the first DC 210 of FIG. 2 to one or more computing entities external to the first DC 210, such as, one or more of the first computing entity 250, the second computing entity 260 and the second, third and fourth DCs 220, 230, 240. The method may be performed at the first data center or may be performed at another location, for example, at a further data center such as the third DC 230 of FIG. 2.

The method includes, at block 402, determining, by a computing system, a first status of a first set of one or more communications connections between a first data center and a second data center. For example, this may include, in examples where the method is performed at the first data center, determining the status of a set of communications connections for the transmission of information from the second data center to the first data center, as described above. In examples where the method is performed at a data center other than the first data center this may include determining the status of a set of communications connections for the transmission of information from the first data center to the other data center, as is also described above. For example, when the method is performed at the second data center, this may include determining the status of a set of communications connections for the transmission of information from the first data center to the second data center.

The determining of the first status of the first set of communication connections, at block 402, may, for example, be based on respective statuses of one or more communications connections of the first set of communications connections, as described above. For example, as described above, the first set may include two or more communications connections, and the first status may be determined to be inoperative responsive to determining that each of the two or more communications connections of the first set is inoperative. For example, the first communications connection may include a first communications connection for receiving heartbeat messages from another of the data centers, as described above. For example, where the method is performed by the first data center, the first set of communications connections may include a first communications connection for receiving heartbeat messages at the first data center from the second data center, as described above. Where, for example, the method is performed by the second data center, the first set of communications connections may include a first communications connection for receiving heartbeat messages at the second data center from the first data center. The heartbeats may be transmitted over a multicast channel and the first communications connection may include a subscription to the multicast channel. The first set of communications connections may also include a second communications connection for allowing a location at another of the data centers to be inspected, as described above. For example, where the method is performed by the first data center, the second communications connection may be to allow the first data center to inspect a location at the second data center, whereas, where the method is performed by the second data center, the second communications connection may be to allow the second data center to inspect a location at the first data center. The second communication connection may include a TCP connection, as described above.

The method includes, at block 404, determining, by the computing system, a second status of a second set of one or more communications connections between the first data center and a third data center different to the second data center. For example, this may include, in examples where the method is performed at the first data center, determining the status of a set of communications connections for the transmission of information from the third data center to the first data center, as described above. In examples where the method is performed at a data center other than the first data center, for example, where the method is performed at the second data center, this may include determining the status of a set of communications connections for the transmission of information from the first data center to the third data center, as is also described above. The determining of the second status may, for example, include any of the features described above with reference to the determining of the first status, at block 402.

As described above, where the method is performed at a data center other than the first data center, determining the status of at least one of the sets of communications connections may, for example, involve obtaining from the data center which is connected to the first data center by the one or more communications connections of the given set, information regarding the one or more communications connections of the given set. For example, where the method is performed at the second data center, block 404 may include obtaining at the second data information from the third data center regarding the one or more communications connections between the third data center and the first data center.

The method includes, at block 406, determining, by the computing system, based on the first status and the second status, an indication of an availability of the first data center to one or more computing entities external to the first data center. For example, this may include determining, based on the first status and the second status indicating that the first and second sets of communications connections are inoperative, that the first data center is unavailable to the one or more computing entities external to the first data center, as described above. In some examples, as described above, the method may include determining respective further statuses of one or more further sets of communications connections between the first data center and one or more further data centers. The determination of the availability of the first data center may be based on these further statuses. For example, the determination of the availability of the first data center may be further based on a fourth status of a fourth set of communications connections between the first data center and a fourth data center.

As is also described above, the method may include taking an action in response to the determination of the availability of the first data center. For example, as described above, if blocks 402 to 406 are performed at the first data center, and the first data center is determined to be unavailable, the method may involve initiating one or more of, a shut-down process to shut down one or more applications running at the first data center, and a disaster recovery process to cause one or more applications running at the data center to operate in a disaster recover mode. As another example, as also described above, if blocks 402 to 406 are performed at another data center other than the first data center, the method may involve initiating a failover process for failing over functionality of the first data center to a failover data center. As is described above, the failover data center may, for example, be the third data center.

VII. EXAMPLE ELECTRONIC TRADING SYSTEM

Figure 5:
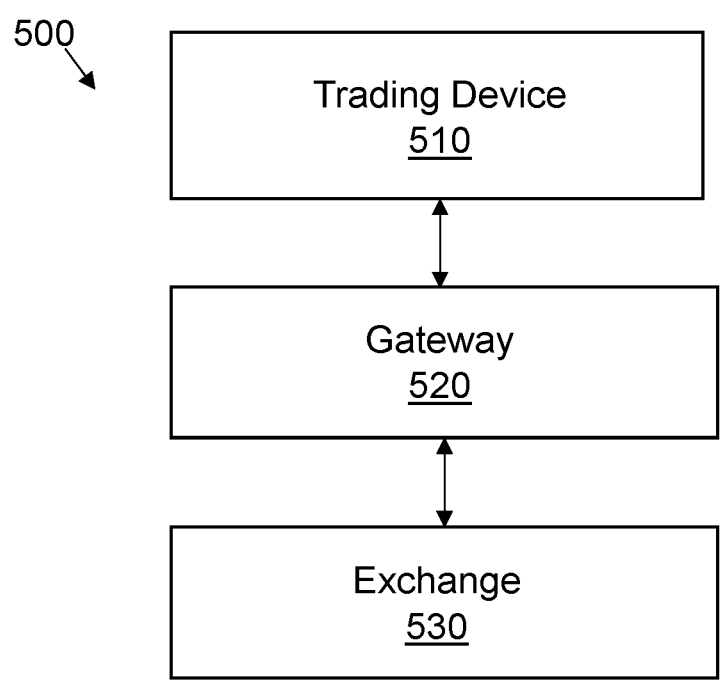
FIG. 5 is a block diagram showing an example of an electronic trading system in which certain embodiments may be employed.

FIG. 5 illustrates a block diagram representative of an example electronic trading system 500 in which certain embodiments may be employed. The system 500 includes a trading device 510, a gateway 520, and an exchange 530. The trading device 510 is in communication with the gateway 520. The gateway 520 is in communication with the exchange 530. As used herein, the phrase "in communication with" encompasses direct communication and/or indirect communication through one or more intermediary components. The trading device 510, the gateway 520 and/or the exchange 530 may include one or more computing devices 100 of FIG. 1. The exemplary electronic trading system 500 depicted in FIG. 5 may be in communication with additional components, subsystems, and elements to provide additional functionality and capabilities without departing from the teaching and disclosure provided herein.

In operation, the trading device 510 may receive market data from the exchange 530 through the gateway 520. The trading device 510 may send messages to the exchange 530 through the gateway 520. A user may utilize the trading device 510 to monitor the market data and/or base a decision to send an order message to buy or sell one or more tradeable objects to the exchange 530. The trading device 510 may use the market data to take trade actions such as to send an order message to the exchange 530. For example, the trading device may run an algorithm that uses the market data as input and outputs trade actions, such as to send an order message to the exchange 530. The algorithm may or may not require input from a user in order to take the trade actions.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 510 may include one or more electronic computing platforms. For example, the trading device 510 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 510 may include a single or multi-core processor in communication with a memory or other storage medium configured to accessibly store one or more computer programs, applications, libraries, computer readable instructions, and the like, for execution by the processor.

By way of example, the trading device 510 may include a computing device, such as a personal computer or mobile device, in communication with one or more servers, where collectively the computing device and the one or more servers are the trading device 510. For example, the trading device 510 may be a computing device and one or more servers together running TT® Platform, an electronic trading platform provided by Trading Technologies International, Inc. of Chicago Illinois ("Trading Technologies"). For example, the one or more servers may run one part of the TT platform, such as a part providing a web server, and the computing device may run another part of the TT platform, such as a part providing a user interface function on a web browser. The computing device and the server may communicate with one another, for example using browser session requests and responses or web sockets, to implement the TT platform. As another example, the trading device 510 may include a computing device, such as a personal computer or mobile device, running an application such as TT® Desktop or TT® Mobile, which are both electronic trading applications also provided by Trading Technologies. As another example, the trading device 510 may be one or more servers running trading tools such as ADL®, AUTOSPREADER®, AUTOTRADER™, and/or MD TRADER®, also provided by Trading Technologies.

The trading device 510 may be controlled or otherwise used by a user. As used herein, the phrase "user" may include, but is not limited to, a human (for example, a trader), trading group (for example, a group of traders), or an electronic trading device (for example, an algorithmic trading system). One or more users may be involved in the control or other use of the trading device.

The trading device 510 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 510 from another computer readable medium. For example, the trading application (or updates to the trading application) may be stored by a manufacturer, developer, or publisher on one or more CDs, DVDs, or USB drives, which are then loaded onto the trading device 510 or to a server from which the trading device 510 retrieves the trading application. As another example, the trading device 510 may receive the trading application (or updates to the trading application) from a server, for example, via the Internet or an internal network. The trading device 510 may receive the trading application or updates when requested by the trading device 510 (for example, "pull distribution") and/or un-requested by the trading device 510 (for example, "push distribution").

The trading device 510 may be adapted to send order messages. For example, the order messages may be sent to through the gateway 520 to the exchange 530. As another example, the trading device 510 may be adapted to send order messages to a simulated exchange in a simulation environment which does not effectuate real-world trades.

The order messages may be sent at the request of a user. For example, a trader may utilize the trading device 510 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 510 to the exchange 530 through the gateway 520. The trading device 510 may communicate with the gateway 520 using a local area network, a wide area network, a multicast network, a wireless network, a virtual private network, an internal network, a cellular network, a peer-to-peer network, a pointof-presence, a dedicated line, the Internet, a shared memory system and/or a proprietary network.

The gateway 520 may include one or more electronic computing platforms. For example, the gateway 520 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 520 facilitates communication. For example, the gateway 520 may perform protocol translation for data communicated between the trading device 510 and the exchange 530. The gateway 520 may process an order message received from the trading device 510 into a data format understood by the exchange 530, for example. Similarly, the gateway 520 may transform market data in an exchange-specific format received from the exchange 530 into a format understood by the trading device 510, for example. As described in more detail below with reference to FIG. 6, in some examples, the gateway 520 may be in communication with cloud services, which may support functions of the gateway 520 and/or the trading device 510.

The gateway 520 may include a trading application, similar to the trading applications discussed above, that facilitates or improves electronic trading. For example, the gateway 520 may include a trading application that tracks orders from the trading device 510 and updates the status of the order based on fill confirmations received from the exchange 530. As another example, the gateway 520 may include a trading application that coalesces market data from the exchange 530 and provides it to the trading device 510. In yet another example, the gateway 520 may include a trading application that provides risk processing, calculates implies, handles order processing, handles market data processing, or a combination thereof.

In certain embodiments, the gateway 520 communicates with the exchange 530 using a local area network, a wide area network, a multicast network, a wireless network, a virtual private network, an internal network, a cellular network, a peer-to-peer network, a point-of-presence, a dedicated line, the Internet, a shared memory system, and/or a proprietary network.

The exchange 530 may be owned, operated, controlled, or used by an exchange entity. Example exchange entities include the CME Group, the Chicago Board Options Exchange, the Intercontinental Exchange, and the Singapore Exchange. The exchange 530 may be an electronic exchange that includes an electronic matching system, such as a computer, server, or other computing device, which is adapted to allow tradeable objects, for example, offered for trading by the exchange, to be bought and sold. The exchange 530 may include separate entities, some of which list and/or administer tradeable objects and others which receive and match orders, for example. The exchange 530 may include an electronic communication network ("ECN"), for example.

The exchange 530 is adapted to receive order messages and match contra-side trade orders to buy and sell tradeable objects. Unmatched trade orders may be listed for trading by the exchange 530. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 510 or other devices in communication with the exchange 530, for example. For example, typically the exchange 530 will be in communication with a variety of other trading devices (which may be similar to trading device 510) which also provide trade orders to be matched.

The exchange 530 is adapted to provide market data. Market data may be provided in one or more messages or data packets or through a shared memory system. For example, the exchange 530 may publish a data feed to subscribing devices, such as the trading device 510 or gateway 520. The data feed may include market data.

The system 500 may include additional, different, or fewer components. For example, the system 500 may include multiple trading devices, gateways, and/or exchanges. In another example, the system 500 may include other communication devices, such as middleware, firewalls, hubs, switches, routers, servers, exchange-specific communication equipment, modems, security managers, and/or encryption/decryption devices.

In examples, the gateway 520 may be provided by or include the first DC 210 of any of the examples described above with reference to FIG. 1 to FIG. 4. For example, the gateway 520 may be configured to provide the same or similar functionality as the first DC 210, or more specifically the first computing system 211 of the first DC 210, according to any of the examples described above with reference to FIG. 1 to FIG. 4. In some examples, the gateway 520 may alternatively be provided by or include any of the other DCs in examples described above with reference to FIG. 1 to FIG. 4, for example the second DC 220 of FIG. 2 or the second DC 320 of FIG. 3. For example, where the first DC 210 is operating normally, the gateway 520 may be provided by or include the first DC 210. However, when the first DC 210 is no longer available to the first computing entity 250 the first DC 210 may be failed over to the second DC 220, at which point the gateway 520 may be provided by or include instead the second DC 220. The exchange 530 may, for example, be provided by the second computing entity 260 according to any one of the examples described above with reference to FIG. 2 and/or the second computing entity 340 described above with reference to FIG. 3.

In examples, the gateway 520 implements apps that are controllable by one or more computing entities external to the gateway 520. For example, as described in more detail below with reference to FIG. 6, the gateway 520 may include a strategy engine app, a risk server app, and an order connector app. In examples where the gateway 520 is provided by the first DC 210 as described above, in response to determining that gateway 520 is no longer available to one or more computing entities external to the gateway, and therefore the apps are no longer controllable by the one or more external computing entities, the gateway 520 may cause the apps to operate in a disaster recovery mode, as described above. In examples where the gateway 520 is provided by the second DC 220 to provide a failover for the first DC 210, as described above, in response to determining that the applications at the first DC 210 are no longer controllable by the one or more external computing entities, the gateway 520 may cause the apps to operate in a failover mode to provide a failover for apps at the first DC 210.

VIII. SPECIFIC ELECTRONIC TRADING SYSTEM

Figure 6:
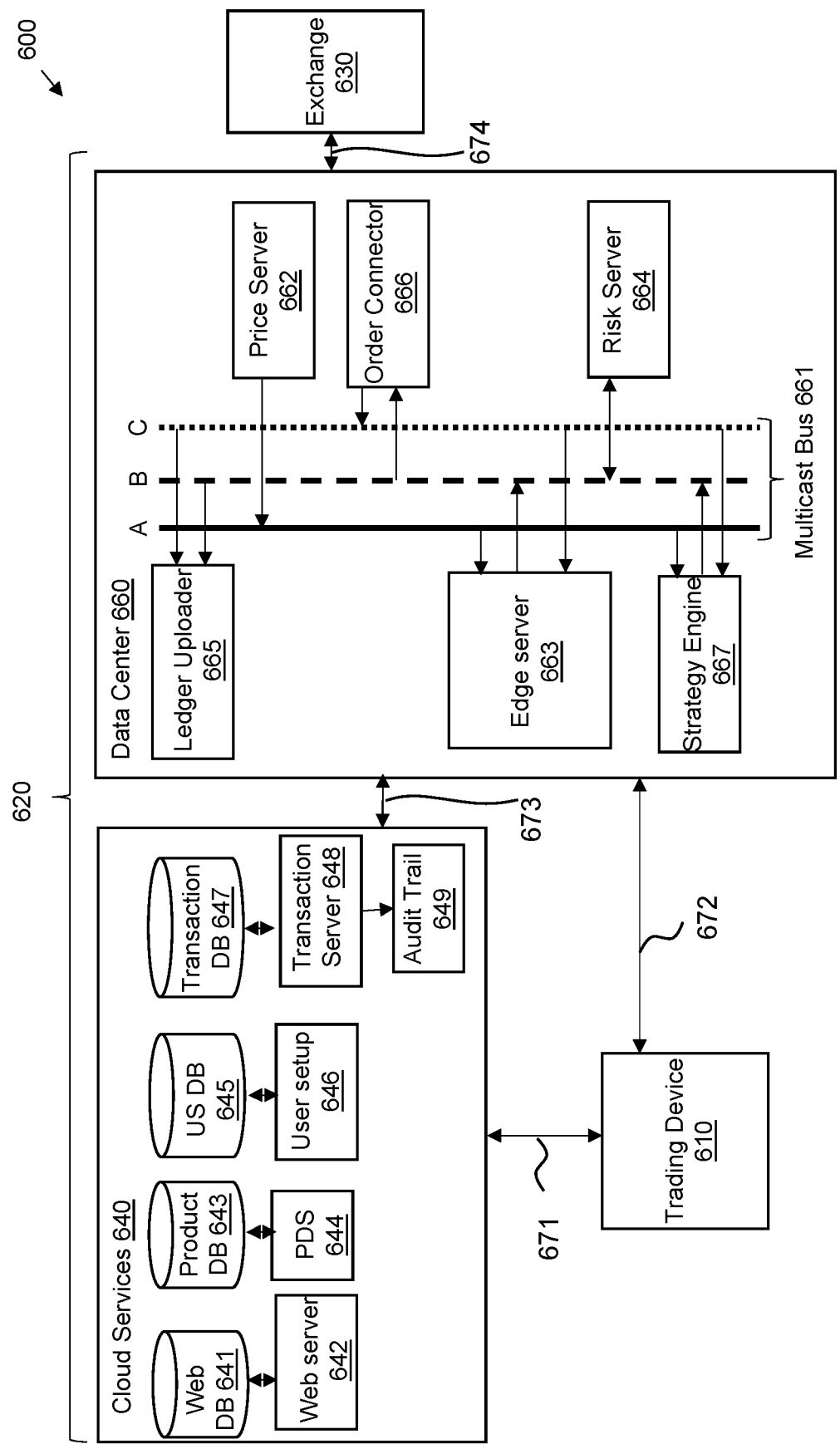
FIG. 6 is a block diagram showing a more detailed example of an electronic trading system in which certain embodiments may be employed.

FIG. 6 illustrates a block diagram representative of an example electronic trading system 600 in which certain embodiments may be employed. The electronic trading system 600 includes a trading device 610, a hybrid cloud system 620, and an exchange 630. The trading device 610 may be the same or similar to the trading device 510 described above with reference to FIG. 5. The exchange 630 may be the same or similar to the exchange 530 described above with reference to FIG. 5. The hybrid cloud system 620, or one or more components thereof, may provide one or more of the functions of the gateway 520 described above with reference to FIG. 5. That is, the functionality of the gateway 520 described above with reference to FIG. 5, or one or more parts of that functionality, may be included within the hybrid cloud system 620.

The hybrid cloud system 620 includes cloud services 640 and data center 660. In the example illustrated in FIG. 6, the cloud services 640 and the components thereof are separate from the data center 660. However, in other examples (not shown), one or more or all of the components and/or functions of the cloud services 640 may instead be implemented in the data center 660. In such examples, or otherwise, the electronic trading system 600 may not include the cloud services 640. In such examples, one or more of the functions of the gateway 520 described above with reference to FIG. 5 may be provided by the data center 660, or one or more components thereof, alone.

In order to provide lower latency for time sensitive processes, the data center 660 may be co-located with the exchange 630 or located in proximity to the exchange 630. Accordingly, functions of the hybrid cloud system 620 that are time sensitive or otherwise benefit from a lower latency with the exchange 630, may be carried out by the data center 660. In general, functions of the hybrid cloud system 620 that are not time sensitive or do not benefit from lower latency with the exchange 630, may be carried out by the cloud services 640. The hybrid cloud system 620 allows for the electronic trading system 600 to be scalable with respect to non-time critical functions while still providing relatively low latency with the exchange 630.

In the example of FIG. 6, the trading device 610 is in communication with the cloud services 640 over a first network 671. For example, the first network 671 may be a wide area network such as the Internet using a hypertext transfer protocol (HTTP) connection. The trading device 610 is in communication with the data center 660 over a second network 672. For example, the trading device 610 may communicate with the data center 660 over a virtual private network or using a secure web socket or a TCP connection. The first network 671 and the second network 672 may be the same network. The data center 660 communicates with the cloud services 640 over a third network 673. For example, the data center 660 may communicate with the cloud services 640 over a private network or virtual private network (VPN) tunnel. The third network 673 may be the same as the first network 671 and/or the second network 672. The data center 660 communicates with the exchange 630 over a fourth network 674. For example, the data center 660 may communicate with the exchange 630 using a local area network, a wide area network, a multicast network, a wireless network, a virtual private network, an internal network, a cellular network, a peer-to-peer network, a point-of-presence, a dedicated line, the Internet, a shared memory system, and/or a proprietary network. The fourth network 674 may be the same as the first network 671, the second network 672 and/or the third network 673.

The cloud services 640 may be implemented as a virtual private cloud, which may be provided by a logically isolated section of an overall web services cloud. In this example, the cloud services 640 include a web database 641 and associated web server 642, a product database 643 and associated product data server (PDS) 644, a user setup database 645 and associated user setup server 646, and a transaction database 647 and associated transaction server 648.

The trading device 610 may communicate with the web server 642. As one example, the trading device 610 may run a web browser, referred to in this disclosure as a browser, which establishes a browsing session with the web server 642. This may occur after appropriate domain name resolution to an IP address of the cloud services 640 and/or after appropriate authentication of the trading device 610 (or user thereof) with the cloud services 640. The browser sends requests to the web server 642, and the web server 642 provides responses to the browser, for example using the HyperText Transfer Protocol (HTTP) or the Secure HyperText Transfer Protocol (HTTPS) protocol. The web server 642 may provide a user interface to the browser, via which a user can interact with the electronic trading platform. The user interface may allow market data to be displayed and/or allow trade orders to be placed. As another example, the trading device 610 may run an application which communicates with the web server 642, such as via an application programming interface (API), to allow a user to interact with the electronic trading platform. The application may provide a user interface via which a user can interact with the electronic trading platform.

The trading device 610 may communicate with the PDS 644. The PDS 644 interfaces with the Product DB 643. The Product DB 643 stores definitions of instruments and permissions of users with respect to the instruments. Specifically, the Product DB 643 stores definitions of tradeable objects, as well as permissions of users to place trade orders with respect to tradeable objects. This information may be provided to the trading device 610. This information may be used by a user interface of the trading device 610 to determine, for the given user of the trading device 610, for which tradeable objects trade orders are allowed to be placed.

The trading device 610 may communicate with the user setup server 646. The user setup server 646 interfaces with the user setup database 645, which stores user's settings, preferences, and other information associated with the user's account. This information may be provided by the trading device 610 to the user setup server 646 on user registration, or at certain times after registration, and the user setup server 646 may store this information in the user setup database 645. This information may be provided to the trading device 610. This information may be used by a user interface of the trading device 610 to determine which market data is to be shown and in which format.

The transaction database 647 stores information on transactions carried out using the electronic trading system 600. The transaction database 647 may store all of the trade orders submitted by users and all of the corresponding order execution reports provided by the exchange 630 when the trade order is executed. The transaction server 648 may interrogate the transaction database 647 to produce an audit trail 649, for example for a given user. This audit trail 649 may be provided to the trading device 610 (or another device) to allow inspection and/or analysis of the trading activity of a given user.

The data center 660 includes a multicast bus 661, a price server 662, an edge server 663, a risk server 664, a ledger uploader server 665, an order connector 666, and a strategy engine server 667. The various components within the data center 660 communicate with one another using the multicast bus 661. This allows for efficient and scalable communications between the components within the data center 660. For example, information provided by one of the components may be received by multiple other of the components. Transmitting this information on a multicast bus 661 to which the other components are subscribed allows for the information to be transmitted in one message, irrespective of how many components may receive the information.

The price server 662 receives market data from the exchange 630. The price server 662 converts this information into a format and/or syntax associated with (for example, used by) the electronic trading system 600. The price server 662 transmits the converted information as one or more multicast messages on the multicast bus 661. Specifically, the price server 662 multicasts this information on a first multicast bus A, to be received by price clients. The edge server 663 and the strategy engine server 667 subscribe to the first multicast bus A and receive the market data from the price server 662. The price server 662 may communicate with the cloud services 640. For example, the price server 662 may provide information on products or tradeable objects to the PDS server 644 for the PDS server 644 to use in defining tradeable objects.

The edge server 663 communicates with the trading device 610. For example, the trading device 610 may communicate with the edge server 663 over a secure web socket or a TCP connection. In some examples, the edge server 663 may be implemented as a server cluster. The number of servers in the cluster may be determined and scaled as necessary depending on utilization. The edge server 663 receives market data over the first multicast bus A and routes the market data to the trading device 610. A user of the trading device 610 may decide to place a trade order based on the market data. The edge server 663 routes trading orders from the trading device 610 towards the exchange 630. Specifically, when the edge server 663 receives an order message from the trading device 610, the edge server 663 multicasts the order message (or at least a portion of the contents thereof) on a second multicast bus B, to be received by order clients. The risk server 664 subscribes to the second multicast bus B and receives the order message from the edge server 663.

The risk server 664 is used to determine a pre-trade risk for a given trade order contained in a given order message. For example, for a given trade order, the risk server 664 may determine whether or not the user placing the trade order is permitted to do so. The risk server 664 may determine whether the user is permitted to trade the quantity of the tradeable object specified in the trade order. The risk server 664 may prevent unauthorized trade orders being placed. The risk server 664 receives the order message from the edge server 663 over the second multicast bus B and processes the order message to determine a risk for the trade order of the message. If the risk server 664 determines that the trade order should not be placed (for example, a risk associated with the trade order is over a threshold) the risk server 664 prevents the trade order from being placed. For example, in this case, the risk server 664 may not transmit the order message to the order connector 666 and may instead transmit a message indicating to the user that the trade order was not placed. If the risk server 664 determines that the trade order should be placed (for example, a risk associated with the trade order is below a threshold) the risk server 664 forwards the order message to the order connector 666. Specifically, the risk server 664 multicasts the order message on the second multicast bus B. The order connector 666 and the ledger uploader 665 are subscribed to the second multicast bus B and receive the order message from the risk server 664.

The ledger uploader server 665 is in communication with the transaction database 647 of the cloud services 640. The ledger uploader server 665 receives the order message from the risk server 664 and transmits the order message to the transaction database 647. The transaction database 647 then stores the order message (or at least a portion of the contents thereof) in the ledger stored in the transaction database 647.

The order connector 666 is in communication with the exchange 630. The order connector 666 receives the order message from the risk server 664, processes the order message for sending to the exchange 630, and sends the processed order message to the exchange 630. Specifically, the processing includes processing the order message into a data format understood by the exchange 630. If the trade order within the order message is executed by the exchange 630, the exchange 630 sends a corresponding execution report message to the order connector 666. The execution report message includes an execution report detailing the execution of the trade order. The order connector 666 applies processing to the execution report message. Specifically, the processing includes processing the execution report message into a data format understood by the electronic trading system and the trading device 610. The order connector 666 multicasts the processed execution report message on a third multicast bus C for receipt by execution report clients. The edge server 663 and the ledger uploader 665 are subscribed to the third multicast bus C and receive the processed execution report message. The ledger uploader 665 communicates with the transaction database 647 to update the ledger with the execution report message (or at least a portion of the contents thereof). The edge server 663 forwards the execution report message to the trading device 610. The trading device 610 may display information based on the execution report message to indicate that the trade order has been executed.

In some examples, order messages may be submitted by the strategy engine server 667. For example, the strategy engine server 667 may implement one or more strategy engines using an algorithmic strategy engine and/or an autospreader strategy engine. The strategy engine 667 may receive market data (from the price server 662 via the first multicast bus A) and automatically generate order messages on the basis of the market data and a suitably configured algorithm. The strategy engine server 667 may transmit an order message to the order connector 666 (via the risk server 664 and the second multicast bus B), and the order connector 666 processes the order message in the same way as described above. Similarly, when the exchange 630 executes the order, the strategy engine 667 may receive (via the third multicast bus C) a corresponding order execution report message from the order connector 666. The order message and the execution report message may be transmitted to the ledger uploader 665 in a similar way to as described above, in order for the ledger uploader 665 to update the ledger stored by the transaction database 647.

In some examples, the trade orders sent by the trading device 610 may not be submitted by a person. For example, the trading device 610 may be a computing device implementing an algorithmic trading application. In these examples, the trading device 610 may not communicate with the web server 642, PDS 644, and/or the user setup server 646, and may not utilize a browser or a user interface for submitting trades. The application running on the trading device 610 may communicate with an adapter associated with the edge server 663. For example, the application and the adapter may communicate with each other using Financial Information Exchange (FIX) messages. In these examples, the adapter may be a FIX adapter. The application running on the trading device 610 may receive market data in a FIX format (the market data being provided by the price server 662 and converted into the FIX format by the FIX adapter associated with the edge server 663). The application running on the trading device 610 may generate trade orders based on the received market data, and transmit order messages in a FIX format to the FIX adapter associated with the edge server 663. The FIX adapter associated with the edge server 663 may process the order messages received in the FIX format into a format understood by the components of the data center 660.

It is to be understood that the electronic trading system 600 is merely an example, and other electronic trading systems could be used. As one example, the electronic trading system 600 need not necessarily include the cloud services 640. As another example, the data center 660 may include more or fewer components than described above with reference to FIG. 6. As another example, a form of messaging between components of the data center 660 other than multicast messaging may be used.

In examples, the data center 660 may be provided by or include the first DC 210 or the second DC 220 of any of the examples described above with reference to FIG. 1 to FIG. 4. For example, the data center 660 may be configured to provide the same or similar functionality as the first DC 210 or the second DC 220 according to any of the examples described above with reference to FIG. 1 to FIG. 4. Accordingly, in examples, the first DC 210 or the second DC 220 according to any of the examples described above with reference to FIG. 1 to FIG. 4 may be implemented by the data center 660. In examples, the exchange 630 may be provided by or include the second computing entity 260 according to any of the examples described above with reference to FIG. 1 to FIG. 4. Accordingly, the exchange 630 is an example of the second computing entity 260 described above with reference to FIG. 1 to FIG. 4.

In examples where the data center 660 is provided by the first DC 310, the strategy engine 667 is an example of the first app 314 described above with reference to FIG. 3, the risk server 664 is another example of the first app 314 described above with reference to FIG. 3, and the order connector 666 is an example of the second app 315 described above with reference to FIG. 3. In examples where the data center 660 is provided by the second DC 320, the strategy engine 667 is an example of the third app 314 described above with reference to FIG. 3, the risk server 664 is another example of the third app 314 described above with reference to FIG. 3, and the order connector 666 is an example of the fourth app 325 described above with reference to FIG. 3.

The apps 667, 664, 666 of the data center 660 are controllable by one or more computing entities external to the data center 660. For example, one or more of the strategy engine 667, the risk server 664 and the order connector 666 may be controllable by one or more computing entities external to the data center 660. For example, the strategy engine 667 may automatically generate order messages on the basis of market data and a suitably configured algorithm. The strategy engine 667 may be controllable by an external computing entity, such as the trading device 610 or another device (not shown), to start, stop, or change the function of the algorithm. The risk server 664 and/or the order connector 666 may be controllable by one or more computing entities external to the data center 660, such as a computing device of an operator of the data center 660 (not shown in FIG. 6).

In examples where the data center 660 is provided by the first DC 210 or the first DC 310 as described above, in response to determining that data center 660 is no longer available to one or more computing entities external to the data center 660, and therefore the apps 667, 664, 666 are no longer controllable by the one or more external computing entities, the data center 660 may cause the apps to operate in a disaster recovery mode, as described above. For example, the strategy engine 667 may stop processing market data, may stop generating order messages, and/or may shut down. This may help prevent uncontrolled order messages from being sent by the strategy engine 667 towards the exchange 530. Further, this may help effective failover of the strategy engine 667 to another data center. For example, it may be beneficial for the strategy engine 667 to not be operating in two places at the same time, as this may result in distorted or otherwise unwanted trade orders being generated. Accordingly, stopping the strategy engine 667 from processing data or shutting down the strategy engine 667 may help ensure that when the strategy engine 667 is failed-over to another data center, the trade orders are not being made twice with the exchange 630. As another example, the risk server 664 may stop routing order messages to the order connector 666. This may help prevent uncontrolled order messages from being sent towards to the exchange 630 and/or may help provide an effective failover of the strategy engine 667 and/or the risk server 664. As another example, the order connector 666 may terminate the communications connections with the exchange 630. This may help prevent uncontrolled order messages from being sent to the exchange 630. Further, in examples the exchange 630 may only support or otherwise allow one communication connection per trading account. Accordingly, the order connector 666 terminating a communication connection, associated with a particular trading account, with the exchange 630 may allow for a communication connection for the particular trading account to be established instead from an order connector of a failover data center to the exchange 630. This may, in turn, allow for the effective failover of the order connector 666 to a failover data center.

In examples, instances of the strategy engine 667, the risk server 664 and/or the order connector 666 may attempt to execute after the data center 660 becomes unavailable to the one or more external computing entities. In this case, operating the strategy engine 667 in the disaster recovery mode may include preventing market data from being processed, preventing trade orders from being generated, and/or shutting down the strategy engine 667 before any order messages are generated by the strategy engine 667. As another example, operating the risk server 664 in a disaster recovery mode may include preventing data from being routed by the risk server 664, or may shutting down the risk server 664 before any order messages are routed to the order connector 666. As another example, operating the order connector 666 in a disaster recovery mode may include preventing communications connections from being made with the exchange 630, or shutting down the order connector 666 before any communications connections are established with the exchange 630. As above, this may prevent uncontrolled orders or order modifications or deletions from reaching the exchange 630 and/or may help provide an effective failover of these applications to another DC.

In examples where the data center 660 is provided by the second DC 220, 330 of FIG. 2 or FIG. 3, so as to provide a failover for the first DC 210, 310 as described above, in response to determining that the applications at the first DC 210, 310 are no longer controllable by the one or more external computing entities, the data center 660 may cause the apps to operate in a failover mode to provide a failover for apps at the first DC 210, 310. For example, the strategy engine 667 may be caused to provide a failover for the stagey engine of the first DC 210, the risk server 664 may be caused to provide a failover for the risk server of the first DC 210 and/or the order connector 666 may be caused to provide a failover for the order connector of the first DC 210, 310.

As one example, the order connector 666 may receive an indication that it is to operate in a failover mode to provide a failover for the order connector of the first DC 210, 310. In response, the order connector 666 may establish communications connections with the exchange 630 (the exchange 630 in this case originally being served by the first DC 210, 310). For example, the order connector 666 may establish a communications connection with the exchange 630 for each trading account that was active at the first DC 210, 310. For example, the user setup DB 645 may store the accounts for which the order connector of the first DC 210, 310 had (or should have had) connections established with the exchange 630. The order connector 666 may access the user setup DB 645 to determine the accounts for which the order connector of the first DC 210, 310 had (or should have had) connections established with the exchange 630. The order connector 666 may also determine from the user setup DB 645 information for each account that may needed to establish the connection with the exchange, such as a username and/or credentials. The order connector 666 may then establish the communications connections accordingly with the exchange 630, thereby to provide a failover for the order connector of the first DC 210, 310.

As another example, the risk server 664 may receive an indication that it is to operate in a failover mode to provide a failover for the risk server of the first DC 210, 310. In response, the risk server 664 may assess the risk of trade orders destined for the exchange 630 and, if the risk is acceptable, route the trade orders to the order connector 666 for sending to the exchange 630. In some examples, trade orders destined for the exchange 630 may anyway be routed to the risk server 664. Under normal operating conditions, the risk server 664 may assess the risk of these trade orders but not route those orders to the order connector 666. In these examples, operating the risk server 664 in the failover mode may include routing those orders (which are destined for the exchange 630 and assessed to have an acceptable risk) to the order connector 666. This may help provide for a fast failover of the risk server of the first DC 210, 310.

As another example, the strategy engine 667 may receive an indication that it is to operate in a failover mode to provide a failover for the strategy engine of the first DC 210, 310. In response, the strategy engine 667 may determine one or more algorithms that were being run by the strategy engine of the first DC 210, 310. For example, the user setup DB may store, in respect of each user, an indication of an algorithm run by the first DC 210, 310 in respect of that user. The strategy engine 667 may access the user setup DB 645 and determine the one or more algorithms that were being run by the strategy engine of the first DC 210, 310. The strategy engine 667 may then initialize the determined algorithm(s) on the strategy engine 667. Further, the strategy engine 667 may obtain the latest state information of the algorithm(s) run on the strategy engine of the first DC 210, 310. For example, the strategy engine 667 may access the transaction database 647 to determine the last trade orders that were made by a particular algorithm of the strategy engine of the first DC 210, 310, and any execution reports that were received from the exchange in respect of those trade orders. Using this information, as well as the market data in respect of the exchange 630 from the price server 662, the strategy engine 667 may execute the algorithm(s) as from where the algorithm(s) in the first DC 210, 310 ceased. The resulting trade orders in respect of the exchange 630 may be routed from the strategy engine 667 to the risk server 664 via multicast bus B. The risk server 664 may route those trade orders (provided they are of acceptable risk) to the order connector via multicast bus B. The order connector may then send these trade orders, over the appropriate connection established with the exchange 630, to the exchange 630. The exchange 630 may return execution reports to the strategy engine 667 via the order connector 666 and multicast bus C, as described above. Accordingly, the data center 660 may provide for an effective failover of the first DC 210, 310.

As used herein, the phrases "configured to" and "adapted to" encompass that an element, structure, or device has been modified, arranged, changed, or varied to perform a specific function or for a specific purpose.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example. The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made, and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

IX. CLAUSES

1. A method including: determining, by a computing system, a first status of a first set of one or more communications connections between a first data center and a second data center; determining, by the computing system, a second status of a second set of one or more communications connections between the first data center and a third data center different to the second data center; and determining, by the computing system, based on the first status and the second status, an indication of an availability of the first data center to one or more computing entities external to the first data center.

2. The method of clause 1, wherein the method includes: determining a third status of a third set of one or more communications connections between the first data center and a fourth data center different to the second data center and the third data center; and wherein the determining of the indication of the availability of the first data center is based on the third status.

3. The method of clause 1 or clause 2, wherein: the determining of the indication of the availability of the first data center includes determining, responsive to the respective statuses of each of the sets of communications connections indicating that each of the sets of communications is inoperative, that the first data center is unavailable to the one or more computing entities external to the first data center.

4. The method of any of clause 1 to clause 3, wherein: for each given set of the sets of communications connections, the determining of the status of the given set is based on respective statuses of the one or more communications connections of the given set.

5. The method of any of clause 1 to clause 4, wherein: each of the sets of communications connections includes two or more communications connections.

6. The method of clause 5, wherein: determining the status of a given one of the sets of communications connections includes determining respective statuses of the two or more communications connections of the given set and determining the given set to be inoperative responsive to determining that each of the two or more communications connections of the given set is inoperative.

7. The method of any of clause 1 to clause 6, wherein: each of the sets of communications connections includes a respective first communications connection for receiving heartbeat messages from a given one of the data centers; and for each given set of the sets of communications connections, determining the status of the given set includes determining a status of the first communications connection of the given set by monitoring receipt of the heartbeat messages.

8. The method of clause 7, wherein: the first communications connections each include a subscription to one or more multicast channels over which the heartbeat messages are transmitted.

9. The method of any of clause 1 to clause 8, wherein: each of the sets of communications connections includes a respective second communications connection for allowing inspection of a location at a given one of the data centers; and for each given set of the sets of communications connections, determining the status of the given set includes determining whether the location at the given one of the data centers can be successfully inspected by use of the respective second communications connection.

10. The method of clause 9, wherein the second communications connections each include a respective TCP connection.

11. The method of any of clause 1 to clause 10, wherein the determining of the respective statuses of each of the sets of communications connections and the determining of the availability of the first data center are performed at the first data center.

12. The method of clause 11, wherein the method includes: responsive to determining that the first data center is unavailable to the one or more computing entities external to the first data center, initiating one or more of: a shut-down process to shut down one or more applications running at the first data center; a disaster recovery process to cause one or more applications running at the first data center to operate in a disaster recovery mode.

13. The method of any of clause 1 to clause 10, wherein the determining of the respective statuses of each of the sets of communications connections and the determining of the availability of the first data center are performed at a data center different to the first data center.

14. The method of clause 13, wherein: the determining of the respective statuses of each of the sets of communications connections and the determining of the availability of the first data center are performed at the third data center.

15. The method of clause 13 or clause 14, wherein: for at least one given set of the sets of communications connections, determining the status of the given set includes: obtaining, from the data center which is connected to the first data center by the one or more communication connections of the given set, information regarding the one or more communications connections of the given set; and determining the status of the given set based on the obtained information.

16. The method of any of clause 13 to clause 15, wherein the method includes: responsive to determining that the first data center is unavailable to the one or more computing entities external to the first data center, initiating a failover process for failing over functionality of the first data center to a failover data center.

17. The method of clause 16, wherein the initiating of the failover process includes: sending, from the data center which determines that the first data center is unavailable, a message to the failover data center to instruct the failover data center to fail over the functionality of the first data center.

18. The method of clause 16 or clause 17, wherein the failover data center is the second data center.

19. The method of any of clause 16 to clause 18, wherein the failover process includes, for each of one or more applications running at the first data center, one or more of: running the application at the failover data center; and modifying the operation of an existing application at the failover data center to include one or more functions of the application.

20. The method of any of clause 13 to clause 19, wherein the data center different to the first data center, at which the determining of the respective statuses of each of the sets of communications connections and the determining of the availability of the first data center are performed, performs the determinations responsive to a determination that another data center is unavailable to perform the determinations.

21. A computing system, including: a memory; and one or more processors configured to: determine a first status of a first set of one or more communications connections between a first data center and a second data center; determine a second status of a second set of one or more communications connections between the first data center and a third data center different to the second data center; and determine, based on the first status and the second status, an indication of an availability of the first data center to one or more computing entities external to the first data center.

22. A data center including: a computing system, including: a memory; and one or more processors configured to: determine a first status of a first set of one or more communications connections between a first data center and a second data center; determine a second status of a second set of one or more communications connections between the first data center and a third data center different to the second data center; and determine, based on the first status and the second status, an indication of an availability of the first data center to one or more computing entities external to the first data center.

23. A tangible computer-readable storage medium including instructions that, when executed, cause one or more processors of a computing system to: determine a first status of a first set of one or more communications connections between a first data center and a second data center; determine a second status of a second set of one or more communications connections between the first data center and a third data center different to the second data center; and determine, based on the first status and the second status, an indication of an availability of the first data center to one or more computing entities external to the first data center.

The invention claimed is:

1. A method including:
    determining, by a computing system, a first status of a first set of one or more communications connections between a first data center and a second data center;
    determining, by the computing system, a second status of a second set of one or more communications connections between the first data center and a third data center different to the second data center; and
    determining, by the computing system, based on the first status and the second status, an indication of an availability of the first data center to one or more computing entities external to the first data center.

2. The method of claim 1, wherein the method includes:
    determining a third status of a third set of one or more communications connections between the first data center and a fourth data center different to the second data center and the third data center; and
    wherein the determining of the indication of the availability of the first data center is based on the third status.

3. The method of claim 1, wherein:
    the determining of the indication of the availability of the first data center includes determining, responsive to the respective statuses of each of the sets of communications connections indicating that each of the sets of communications is inoperative, that the first data center is unavailable to the one or more computing entities external to the first data center.

4. The method of claim 1, wherein:
    for each given set of the sets of communications connections, the determining of the status of the given set is based on respective statuses of the one or more communications connections of the given set.

5. The method of claim 1, wherein:
    each of the sets of communications connections includes two or more communications connections.

6. The method of claim 5, wherein:
    determining the status of a given one of the sets of communications connections includes determining respective statuses of the two or more communications connections of the given set and determining the given set to be inoperative responsive to determining that each of the two or more communications connections of the given set is inoperative.

7. The method of claim 1, wherein:
    each of the sets of communications connections includes a respective first communications connection for receiving heartbeat messages from a given one of the data centers; and
    for each given set of the sets of communications connections, determining the status of the given set includes determining a status of the first communications connection of the given set by monitoring receipt of the heartbeat messages.

8. The method of claim 7, wherein:
    the first communications connections each include a subscription to one or more multicast channels over which the heartbeat messages are transmitted.

9. The method of claim 1, wherein:
    each of the sets of communications connections includes a respective second communications connection for allowing inspection of a location at a given one of the data centers; and
    for each given set of the sets of communications connections, determining the status of the given set includes determining whether the location at the given one of the data centers can be successfully inspected by use of the respective second communications connection.

10. The method of claim 9, wherein the second communications connections each include a respective TCP connection.

11. The method of claim 1, wherein the determining of the respective statuses of each of the sets of communications connections and the determining of the availability of the first data center are performed at the first data center.

12. The method of claim 11, wherein the method includes:
    responsive to determining that the first data center is unavailable to the one or more computing entities external to the first data center, initiating one or more of:
    a shut-down process to shut down one or more applications running at the first data center;
    a disaster recovery process to cause one or more applications running at the first data center to operate in a disaster recovery mode.

13. The method of claim 1, wherein the determining of the respective statuses of each of the sets of communications connections and the determining of the availability of the first data center are performed at a data center different to the first data center.

14. The method of claim 13, wherein:
    the determining of the respective statuses of each of the sets of communications connections and the determining of the availability of the first data center are performed at the third data center.

15. The method of claim 13, wherein:
for at least one given set of the sets of communications connections, determining the status of the given set includes:
obtaining, from the data center which is connected to the first data center by the one or more communication connections of the given set, information regarding the one or more communications connections of the given set; and
determining the status of the given set based on the obtained information.

16. The method of claim 13, wherein the method includes:
responsive to determining that the first data center is unavailable to the one or more computing entities external to the first data center, initiating a failover process for failing over functionality of the first data center to a failover data center.

17. The method of claim 16, wherein the initiating of the failover process includes:
sending, from the data center which determines that the first data center is unavailable, a message to the failover data center to instruct the failover data center to fail over the functionality of the first data center.

18. The method of claim 16, wherein the failover data center is the second data center.

19. The method of claim 16, wherein the failover process includes, for each of one or more applications running at the first data center, one or more of:
running the application at the failover data center; and
modifying the operation of an existing application at the failover data center to include one or more functions of the application.

20. The method of claim 13, wherein the data center different to the first data center, at which the determining of the respective statuses of each of the sets of communications connections and the determining of the availability of the first data center are performed, performs the determinations responsive to a determination that another data center is unavailable to perform the determinations.

* * * * *